(12) United States Patent
Maruyama

(10) Patent No.: US 12,214,716 B2
(45) Date of Patent: Feb. 4, 2025

(54) VEHICLE HEADLIGHT AND VEHICLE HEADLIGHT SYSTEM

(71) Applicant: KOITO MANUFACTURING CO., LTD., Tokyo (JP)

(72) Inventor: Yuta Maruyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 114 days.

(21) Appl. No.: 17/915,786

(22) PCT Filed: Mar. 29, 2021

(86) PCT No.: PCT/JP2021/013245
§ 371 (c)(1),
(2) Date: Sep. 29, 2022

(87) PCT Pub. No.: WO2021/200803
PCT Pub. Date: Oct. 7, 2021

(65) Prior Publication Data
US 2023/0202382 A1      Jun. 29, 2023

(30) Foreign Application Priority Data
Mar. 31, 2020   (JP) .................................. 2020-064867

(51) Int. Cl.
*B60Q 1/14*       (2006.01)
(52) U.S. Cl.
CPC .......... *B60Q 1/143* (2013.01); *B60Q 2300/41* (2013.01); *B60Q 2300/42* (2013.01)
(58) Field of Classification Search
None
See application file for complete search history.

(56) References Cited

U.S. PATENT DOCUMENTS

| 1,480,803 A | 1/1924 | Bone |
| 2009/0279317 A1 | 11/2009 | Tatara |

(Continued)

FOREIGN PATENT DOCUMENTS

| CN | 109668116 A | 4/2019 |
| EP | 2 116 421 A2 | 11/2009 |

(Continued)

OTHER PUBLICATIONS

International Search Report for PCT/JP2021/013245 dated, May 25, 2021 (PCT/ISA/210).

(Continued)

*Primary Examiner* — John F Mortell
(74) *Attorney, Agent, or Firm* — Sughrue Mion, PLLC

(57) ABSTRACT

A control unit (CO) in a vehicle headlight (1) controls a light emitting unit (10) such that, when a signal indicating another vehicle (80, 90) is input, a region including a first region (211, 311) in a light distribution pattern (200, 300) becomes a light reduction region (210, 310) in which a total light flux amount of light from the light emitting unit (10) decreases as compared with that before the signal indicating the other vehicle (80, 90) is input, and controls the light emitting unit (10) such that, when a signal indicating a turn sign of the other vehicle (80, 90) is input, at least the first region (211, 311) in the light reduction region (210, 310) expands to a turning direction side indicated by the turn sign as compared with that before the signal indicating the turn sign of the other vehicle (80, 90) is input.

7 Claims, 15 Drawing Sheets

(56) References Cited

U.S. PATENT DOCUMENTS

| | | | |
|---|---|---|---|
| 2012/0226412 A1* | 9/2012 | Nakadate | B60Q 1/143 |
| | | | 701/36 |
| 2013/0218413 A1 | 8/2013 | Tanaka et al. | |
| 2015/0042226 A1 | 2/2015 | Hibino | |
| 2020/0238892 A1 | 7/2020 | Maruyama et al. | |

FOREIGN PATENT DOCUMENTS

| | | |
|---|---|---|
| EP | 2 281 719 A1 | 2/2011 |
| EP | 2 639 105 A1 | 9/2013 |
| EP | 2 644 449 A1 | 10/2013 |
| EP | 2 752 615 A1 | 7/2014 |
| JP | 2011-031807 A | 2/2011 |
| JP | 2013-043617 A | 3/2013 |
| JP | 2013-154745 A | 8/2013 |
| JP | 2013-224135 A | 10/2013 |

OTHER PUBLICATIONS

Extended European Search Report issued Jul. 17, 2023 in European Application No. 21780233.9.
Office Action issued Sep. 25, 2024 in Chinese Application No. 202180026225.2.

* cited by examiner

VEHICLE HEADLIGHT AND VEHICLE HEADLIGHT SYSTEM

CROSS REFERENCE TO RELATED APPLICATIONS

This application is a National Stage of International Application No. PCT/JP2020/013245 filed Mar. 29, 2021, claiming priority based on Japanese Patent Application No. 2020-064867 filed Mar. 31, 2020.

TECHNICAL FIELD

The present invention relates to a vehicle headlight and a vehicle headlight system including the vehicle headlight.

BACKGROUND ART

A vehicle headlight that changes a light distribution pattern of emitted light on the basis of information from a detection device that detects another vehicle located in front of a vehicle is known. Patent Literature 1 below describes such a vehicle headlight, and the vehicle headlight includes a light emitting unit capable of changing a light distribution pattern of emitted light, a detection device that detects another vehicle located in front of the vehicle, and a control unit that controls an irradiation range of the vehicle headlight so that light is irradiated to surroundings of the other vehicle while suppressing irradiation of the other vehicle with light. The control unit controls the lamp such that the width in the horizontal direction of the region where light irradiation is suppressed changes according to the position in the horizontal direction of the other vehicle. With such a configuration, it is possible to secure an appropriate gap between the other vehicle and the irradiation range according to the position of the other vehicle with respect to the vehicle, and it is possible to suppress dazzling of the driver of the other vehicle.

Patent Literature 1: JP 2011-31807 A

SUMMARY OF THE INVENTION

However, Patent Literature 1 does not consider dazzling of a driver of another vehicle when the other vehicle turns.

Therefore, an object of the present invention is to provide a vehicle headlight that can suppress dazzling of a driver of another vehicle when the other vehicle turns, and a vehicle headlight system including the vehicle headlight.

In order to achieve the above object, the present invention provides a vehicle headlight mounted on a vehicle, including: a light emitting unit that emits light of a changeable light distribution pattern toward another vehicle located in front of the vehicle; a determination unit that determines information from a detection device that detects the other vehicle and generates a signal indicating a turn sign of the other vehicle; and a control unit that receives a signal indicating the other vehicle detected by the detection device and a signal indicating a turn sign of the other vehicle, wherein the control unit controls the light emitting unit such that, when the signal indicating the other vehicle is input, a region including at least a first region overlapping with an entire visual recognition portion for allowing a driver of the other vehicle to visually recognize the outside of the vehicle in the light distribution pattern becomes a light reduction region in which a total light flux amount of light from the light emitting unit decreases as compared with that before the signal indicating the other vehicle is input, and controls the light emitting unit such that, when the signal indicating a turn sign of the other vehicle is further input in addition to the signal indicating the other vehicle, at least the first region in the light reduction region expands to a turning direction side indicated by the turn sign as compared with that after the signal indicating the other vehicle is input and before the signal indicating the turn sign of the other vehicle is input.

Here, the turn sign may be, for example, a state in which a turn lamp of another vehicle is blinking. The turning direction side indicated by the turn sign means a turning side of another vehicle when viewed from the host vehicle. For example, when the other vehicle is a preceding vehicle and, for example, a right turn lamp of the other vehicle blinks, the side on which the other vehicle turns is the right side. On the other hand, when the other vehicle is an oncoming vehicle and the left turn lamp of the other vehicle blinks, for example, the side on which the other vehicle turns is the right side as viewed from the host vehicle. In addition, examples of the visual recognition portion for the driver of the other vehicle to visually recognize the outside of the vehicle include a front window in a case where the other vehicle is an oncoming vehicle, and examples of the visual recognition portion include a side mirror, a rear-view mirror, an imaging device that images the rear of the vehicle, and the like in a case where the other vehicle is a preceding vehicle.

In this vehicle headlight, as described above, when a signal indicating a turn sign of another vehicle is input to the control unit, at least the first region of the light reduction region expands to the turning direction side as compared with a region after the signal indicating another vehicle is input and before the signal indicating the turn sign of another vehicle is input. For this reason, in the light distribution pattern, a region where the line of sight of the driver of another vehicle moves may be darker than other regions of the light distribution pattern. Therefore, according to this vehicle headlight, it is possible to suppress dazzling of a driver of another vehicle when the other vehicle turns.

Preferably, the light reduction region includes a second region connected to a lower edge of the first region, and a left edge of the second region is located on a right side of a left edge of the first region, and a right edge of the second region is located on a left side of a right edge of the first region According to such a configuration, since the width of the light reduction region in the horizontal direction is narrowed below the visual recognition portion of the other vehicle, the proportion of the bright region in the light distribution pattern can be increased. Therefore, forward visibility of the host vehicle can be improved. In addition, there is a strong tendency that a region below the visual recognition portion of the other vehicle does not touch the line of sight of the driver of the other vehicle. Therefore, even if the second region is formed in this way, dazzling of a driver of another vehicle can be suppressed.

The light reduction region may include a third region connected to an upper edge of the first region, and the control unit may control the light emitting unit such that an edge of the third region on the turning direction side is located closer to the other vehicle than an edge of the first region on the turning direction side when the signal indicating the turn sign of the other vehicle is further input in addition to the signal indicating the other vehicle.

In this case, when the other vehicle issues the turn sign, the third region located on the upper side of the first region is prevented from expanding toward the turning direction. As a result, the proportion of the bright region in the light distribution pattern increases as compared with the case where the expand of the third region toward the turning direction side is equal to the expand of the first region toward the turning direction side. Therefore, it is possible to suppress a decrease in forward visibility of the host vehicle.

Preferably, when the third region is included in the light reduction region, the control unit controls the light emitting unit so that an edge of the third region on the turning direction side does not move from a position before the signal indicating the turn sign of the other vehicle is input when the signal indicating the turn sign of the other vehicle is further input in addition to the signal indicating the other vehicle.

In this case, when the other vehicle issues the turn sign, the expand of the third region located on the upper side of the first region toward the turning direction side is further suppressed, so that the proportion of the bright region in the light distribution pattern becomes larger. Therefore, it is possible to further suppress a decrease in forward visibility of the host vehicle.

Preferably, when the third region is included in the light reduction region, a position in a vertical direction of an upper edge of the first region is a position above a roof panel of the other vehicle and below a center between the upper edge of the light distribution pattern and the roof panel.

The visual recognition portion of the other vehicle exists substantially below the roof panel of the other vehicle. Therefore, if the upper edge of the first region is located above the roof panel, the entire visual recognition portion can more reliably overlap with the first region. In addition, if the upper edge of the first region is at a position lower than the center between the upper edge of the light distribution pattern and the roof panel, the area of the third region can be suppressed from becoming too small. For this reason, when another vehicle issues a turn sign, unnecessary expansion of the light reduction region is further suppressed, and deterioration in forward visibility of the host vehicle can be further suppressed.

Further, the control unit may control the light emitting unit such that an edge of the light reduction region on the turning direction side is separated from a vertical line passing through an end portion of the other vehicle on the turning direction side as going upward when the signal indicating the turn sign of the other vehicle is further input in addition to the signal indicating the other vehicle.

With such a configuration, when the other vehicle issues the turn sign, the first region of the light reduction region expands to the side on which the other vehicle turns. Therefore, dazzling of the driver of the other vehicle can be suppressed when the other vehicle turns. In addition, the control load of the control unit can be reduced.

The determination unit may determine a distance to the other vehicle based on information from the detection device, and outputs a signal indicating the other vehicle to the control unit when the distance is equal to or less than a predetermined distance.

Generally, dazzling to another vehicle is more likely to occur as the distance to the other vehicle is shorter. Therefore, dazzling to the other vehicle can be effectively suppressed by inputting a signal indicating the other vehicle to the control unit CO in a case where the distance is equal to or less than the predetermined distance. In addition, when the distance to the other vehicle is larger than the predetermined distance, the light reduction region 210, 310 does not expand, so that it is possible to enhance the visibility of the host vehicle while suppressing dazzling of the other vehicle.

In addition, in order to achieve the above object, a vehicle headlight system of the present invention includes the vehicle headlight according to any one of the above, and a detection device that detects the other vehicle.

The vehicle headlight system includes the vehicle headlight according to any one of the above. Therefore, this vehicle headlight can suppress dazzling of a driver of another vehicle when the other vehicle turns.

As described above, according to the present invention, it is possible to provide a vehicle headlight capable of suppressing dazzling of a driver of another vehicle when the other vehicle turns, and a vehicle headlight system including the vehicle headlight.

DESCRIPTION OF EMBODIMENTS

Hereinafter, embodiments for implementing a vehicle headlight according to the present invention will be illustrated together with the accompanying drawings. The embodiments exemplified below are intended to facilitate understanding of the present invention and are not intended to limit the present invention. The present invention can be modified and improved from the following embodiments without departing from the gist thereof. In the accompanying drawings, the dimensions of each member may be exaggerated for easy understanding.

First Embodiment

Figure 1:
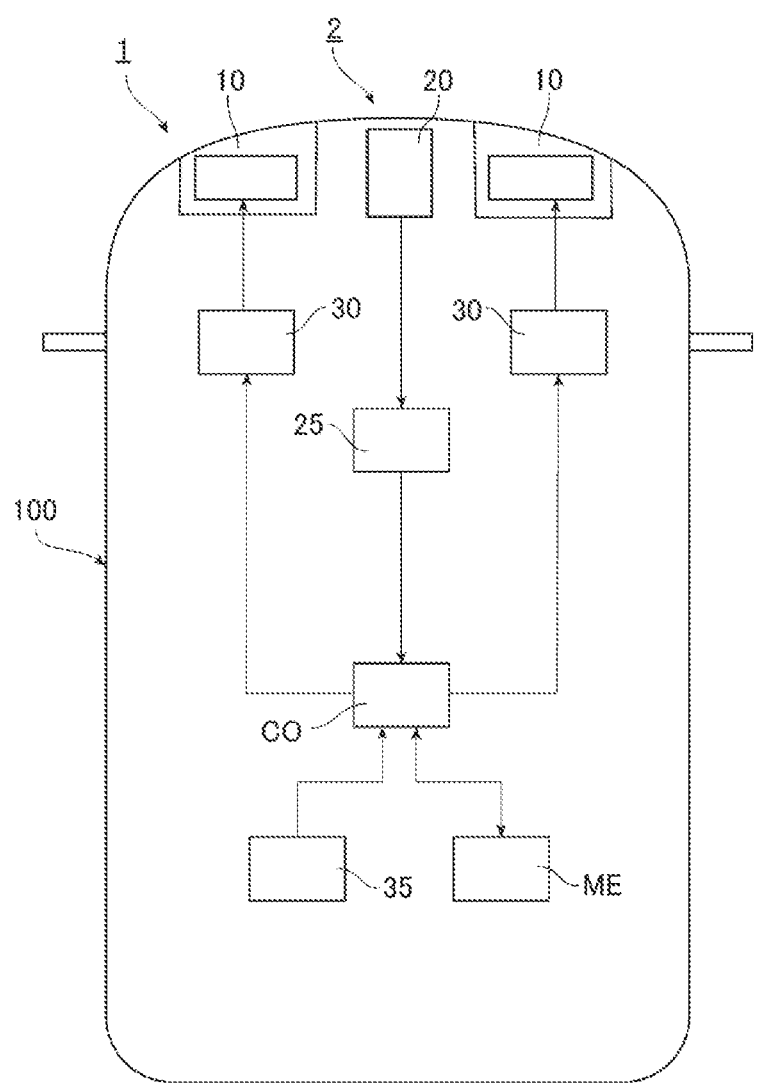
FIG. 1 is a plan view conceptually illustrating a vehicle including a vehicle headlight and a vehicle headlight system according to a first embodiment of the present invention.

FIG. 1 is a plan view conceptually illustrating a vehicle 100 including a vehicle headlight and a vehicle headlight system according to a first embodiment. As illustrated in FIG. 1, the vehicle 100 includes a vehicle headlight system 2, and the vehicle headlight system 2 includes a vehicle headlight 1 and a detection device 20 that detects another vehicle located in front of the vehicle 100.

The vehicle headlight 1 of the present embodiment is a headlight that can be mounted on an automobile as a vehicle. The vehicle headlight 1 mainly includes a pair of left and right light emitting units 10, a control unit CO, a determination unit 25, a pair of power supply circuits 30, and a memory ME. In the present specification, unless otherwise specified, "right" means the right side from the viewpoint of the driver of the vehicle 100 that is the host vehicle, and "left" means the left side from the viewpoint of the driver of the vehicle 100 that is the host vehicle.

In the present embodiment, the pair of light emitting units 10 have substantially symmetrical shapes in the horizontal direction of the vehicle 100, and emit light of a changeable light distribution pattern toward another vehicle located in front of the vehicle 100. In addition, the configuration of one light emitting unit 10 is the same as the configuration of the other light emitting unit 10 except that the shape is substantially symmetrical. Therefore, one light emitting unit 10 will be described below, and the description of the other light emitting unit 10 will be omitted.

Figure 2:
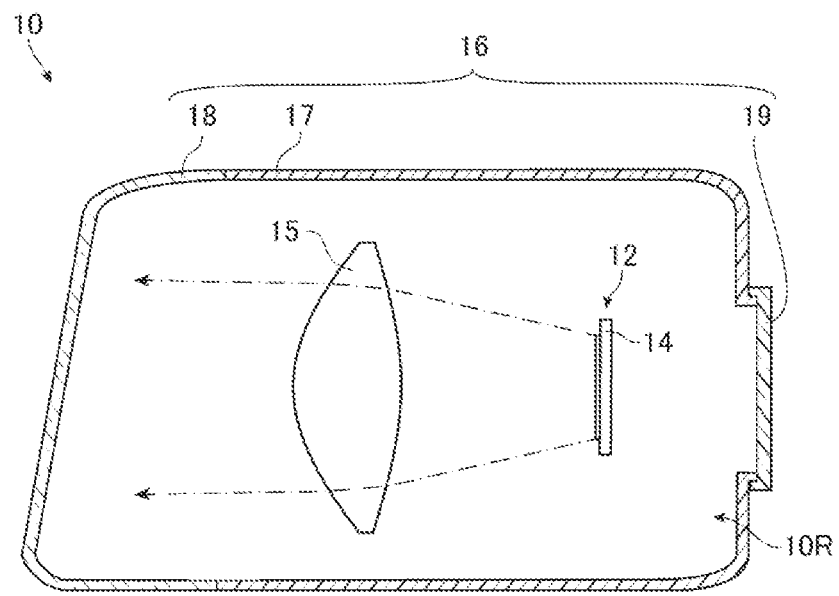
FIG. 2 is a side view schematically illustrating one light emitting unit illustrated in FIG. 1.

FIG. 2 is a side view schematically showing one light emitting unit 10 shown in FIG. 1. As illustrated in FIG. 2, the light emitting unit 10 mainly includes a light distribution pattern forming unit 12, a projection lens 15, and a housing 16. In FIG. 2, the housing 16 is illustrated in a vertical cross-section.

The housing 16 mainly includes a lamp housing 17, a front cover 18, and a back cover 19. The front of the lamp housing 17 is opened, and the front cover 18 is fixed to the lamp housing 17 so as to close the opening. An opening smaller than that in the front is formed behind the lamp housing 17, and the back cover 19 is fixed to the lamp housing 17 so as to close the opening.

A space formed by the lamp housing 17, the front cover 18 closing the front opening of the lamp housing 17, and the back cover 19 closing the rear opening of the lamp housing 17 is a lamp chamber 10R, and the light distribution pattern forming unit 12 and the projection lens 15 are accommodated in the lamp chamber 10R.

Figure 3:
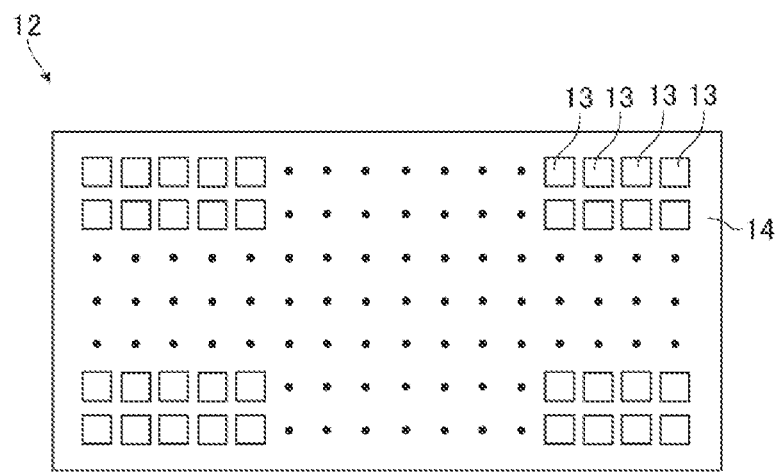
FIG. 3 is a front view schematically illustrating a light distribution pattern forming unit illustrated in FIG. 2.

FIG. 3 is a front view schematically illustrating the light distribution pattern forming unit 12 illustrated in FIG. 2. As illustrated in FIGS. 2 and 3, the light distribution pattern forming unit 12 of the present embodiment includes a plurality of light emitting elements 13 that emit light and a circuit board 14 on which the plurality of light emitting elements 13 is mounted. The plurality of light emitting elements 13 are arranged in a matrix to form rows in the vertical direction and the horizontal direction, and emit light forward. In the present embodiment, these light emitting elements 13 are light emitting diodes (LEDs), and the light distribution pattern forming unit 12 is a so-called LED array. Note that the number of the light emitting elements 13, the number of rows of the light emitting elements 13, the number of the light emitting elements 13 in each row of the light emitting elements 13, the direction in which the light emitting elements 13 are arranged, and the type of the light emitting elements 13 are not particularly limited.

Such a light distribution pattern forming unit 12 can form a predetermined light distribution pattern by selecting the light emitting element 13 that emits light. In addition, the light distribution pattern forming unit 12 can adjust the light intensity distribution in the predetermined light distribution pattern by adjusting the intensity of the light emitted from each light emitting element 13.

The projection lens 15 is a lens that adjusts a divergence angle of incident light. The projection lens 15 is disposed in front of the light distribution pattern forming unit 12, light emitted from the light distribution pattern forming unit 12 is incident thereon, and a divergence angle of the light is adjusted by the projection lens 15. In the present embodiment, the projection lens 15 is a lens in which the incident surface and the emission surface are formed in a convex shape, and the rear focal point of the projection lens 15 is located on or near the light emission surface of any one of the light emitting elements 13 in the light distribution pattern forming unit 12. A divergence angle of light emitted from the light distribution pattern forming unit 12 is adjusted by the projection lens 15, and light of a predetermined light distribution pattern is emitted from the light emitting unit 10 toward the front of the vehicle 100 via the front cover 18.

For example, an integrated circuit such as a microcontroller, an integrated circuit (IC), a large-scale integrated circuit (LSI), or an application specific integrated circuit (ASIC), or a numerical control (NC) device can be used as the control unit CO. In addition, when the NC device is used, the control unit CO may use a machine learning device or may not use a machine learning device. As described later, the control unit CO controls the pair of light emitting units 10.

A light switch 35 included in the vehicle 100 is connected to the control unit CO. The light switch 35 of the present embodiment is a switch that selects emission or non-emission of light. For example, the light switch 35 outputs a signal indicating emission of light to the control unit CO when the light switch 35 is on, and does not output a signal to the control unit CO when the light switch 35 is off.

The determination unit 25 determines whether or not another vehicle detected by the detection device 20 satisfies a predetermined requirement on the basis of the information from the detection device 20. Examples of the predetermined requirement include that a distance between another vehicle and the vehicle 100 is equal to or less than a predetermined distance. In the present embodiment, the predetermined distance is 100 m. However, the predetermined distance may be larger than 100 m. When the predetermined requirement is satisfied, the determination unit 25 generates a signal indicating another vehicle and outputs the signal to the control unit CO. When the other vehicle is in a state of satisfying the predetermined requirement and a signal indicating that the other vehicle is a preceding vehicle is input from the detection device 20, the determination unit 25 of the present embodiment outputs, to the control unit CO, a signal indicating a preceding vehicle as a signal indicating the other vehicle, a signal related to the distance from the vehicle 100 to the preceding vehicle, a signal indicating the positions of a pair of red light spots in a captured image as information on the position of the preceding vehicle with respect to the vehicle 100, and a signal indicating that the right or left turn lamp of the preceding vehicle is turned on. In addition, when the other vehicle is in a state of satisfying the predetermined requirement and a signal indicating that the other vehicle is an oncoming vehicle is input from the detection device 20, the determination unit 25 of the present embodiment outputs, to the control unit CO, a signal indicating an oncoming vehicle as a signal indicating the other vehicle, a signal indicating the distance from the vehicle 100 to the oncoming vehicle, a signal indicating the positions of a pair of white light spots in a captured image as information on the position of the oncoming vehicle with respect to the vehicle 100, and a signal indicating that the right or left turn lamp of the oncoming vehicle is blinking. On the other hand, when the other vehicle does not satisfy the predetermined requirement and when no signal is input from the detection device 20 to the determination unit 25, the determination unit 25 does not output a signal to the control unit CO. Therefore, the determination by the determination unit 25 can be understood as changing the signal to be output in a case-by-case manner according to the signal input from the detection device 20 as described above.

One power supply circuit 30 corresponds to one light emitting unit 10, and the other power supply circuit 30 corresponds to the other light emitting unit 10. Each power supply circuit 30 includes a driver, and when a signal is input from the control unit CO, the driver adjusts power supplied to each light emitting element 13 of the light distribution pattern forming unit 12. In this way, the intensity of the light emitted from each light emitting element 13 is adjusted. The driver of the power supply circuit 30 may adjust the power supplied to each light emitting element 13 by pulse width modulation (PWM) control. In this case, the intensity of the light emitted from each light emitting element 13 is adjusted by adjusting the duty cycle.

The memory ME is configured to store information and read the stored information. The memory ME is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media except for a transitory propagating signal, and does not exclude a volatile recording medium.

The memory ME stores a table in which information on a light distribution pattern formed by light emitted from the light emitting unit 10 and information on other vehicles detected by the detection device 20 are associated with each other. Examples of the information on the light distribution pattern formed by the light emitted from the light emitting unit 10 include information on power supplied to each light emitting element 13 of the light distribution pattern forming unit 12. Examples of the information on the power supplied to each light emitting element 13 include information on the power supplied to each light emitting element 13 at the time of forming a light distribution pattern of a high beam to be described later and at the time of forming a light distribution pattern according to the turn sign. In addition, examples of the information of the other vehicle detected by the detection device 20 include information on whether the other vehicle is a preceding vehicle or an oncoming vehicle, information on a distance from the vehicle 100 to the other vehicle, information on a position of the other vehicle with respect to the vehicle 100, and information on whether a turn lamp of the other vehicle is blinking. Examples of the information on the position of the other vehicle with respect to the vehicle 100 include information on the position of a pair of light spots in the captured image, and examples of the information on whether or not the turn lamp of the other vehicle is blinking include information on at least one orange light spot in the captured image.

As described above, the detection device 20 constitutes the vehicle headlight system 2 together with the vehicle headlight 1. In the present embodiment, the detection device 20 can identify whether the other vehicle is a preceding vehicle or an oncoming vehicle on the basis of the colors of a pair of light spots to be detected, for example, as described later. In addition, the detection device 20 can detect whether or not another vehicle is going to turn to the right or left when viewed from the vehicle 100. The detection device 20 may include, for example, a camera, a detection unit, and the like (not illustrated). The camera is attached to the front portion of the vehicle 100, and captures an image of the front of the vehicle 100 at predetermined time intervals, for example, 1/30 second intervals. Note that the camera may be a charged coupled device (CCD), for example. The captured image captured by the camera includes at least a portion of a region irradiated with light emitted from the pair of light emitting units 10. The detection unit can detect the presence of the other vehicle and the position of the other vehicle with respect to the vehicle 100 on the basis of the captured image captured by the camera, and can identify whether the other vehicle is a preceding vehicle or an oncoming vehicle. In addition, the detection unit can detect whether another vehicle is going to turn to the right or left when viewed from the vehicle 100.

For example, the detection unit detects the presence of an oncoming vehicle and the position of the oncoming vehicle with respect to the vehicle 100 on the basis of light emitted from a headlight of the oncoming vehicle. Specifically, in a case where there is a pair of white light spots having luminance higher than predetermined luminance and located at a predetermined interval in the horizontal direction in the captured image, the detection unit outputs a signal indicating that an oncoming vehicle is present to the determination unit 25. In this case, the detection unit calculates, for example, the distance from the vehicle 100 to the oncoming vehicle on the basis of the positions of the pair of white light spots in the captured image, the distance between the pair of white light spots, and the like. Then, the detection unit outputs, to the determination unit 25, a signal indicating the positions of a pair of white light spots in the captured image as information on the position of the oncoming vehicle with respect to the vehicle 100, and a signal indicating the calculated distance from the vehicle 100 to the oncoming vehicle. Furthermore, in a case where there is at least one orange light spot having luminance higher than predetermined luminance on the right side of the center between the pair of light spots in the captured image, the detection unit outputs a signal indicating that the right turn lamp of the oncoming vehicle is blinking to the determination unit 25. The signal indicating that the right turn lamp is blinking is a signal indicating that another vehicle is going to turn to the left when viewed from the vehicle 100, and is a signal indicating that the turning direction side indicated by the turn sign of the other vehicle is the left side. When determining that at least one orange light spot having luminance higher than predetermined luminance blinks at predetermined time intervals on the left side of the center between the pair of light spots in the captured image, the detection unit outputs a signal indicating that the left turn lamp of the oncoming vehicle is blinking to the determination unit 25. The signal indicating that the left turn lamp of the oncoming vehicle is blinking is a signal indicating that another vehicle is going to turn right as viewed from the vehicle 100, and is a signal indicating that the turning direction side indicated by the turn sign of the other vehicle is the right side.

In addition, the detection unit detects the presence of the preceding vehicle and the position of the preceding vehicle with respect to the vehicle 100 on the basis of the light emitted from the tail light of the preceding vehicle. Specifically, in a case where there is a pair of red light spots having luminance higher than predetermined luminance and located at a predetermined interval in the horizontal direction in the captured image, the detection unit outputs a signal indicating that a preceding vehicle is present to the determination unit 25. In this case, the detection unit calculates, for example, the distance from the vehicle 100 to the preceding vehicle on the basis of the positions of the pair of red light spots, the distance between the pair of red light spots, and the like. Then, the detection unit outputs a signal indicating the positions of a pair of red light spots in the captured image as information on the position of the preceding vehicle with respect to the vehicle 100 and a signal indicating the calculated distance from the vehicle 100 to the preceding vehicle to the determination unit 25. Furthermore, in a case where it is determined that at least one orange light spot having luminance higher than predetermined luminance blinks at a predetermined time interval on the right side of the center between the pair of light spots in the captured image, the detection unit outputs a signal indicating that the right turn lamp of the preceding vehicle is blinking to the determination unit 25. The signal indicating that the right turn lamp of the preceding vehicle is blinking is a signal indicating that the other vehicle is going to turn right as viewed from the vehicle 100, and is a signal indicating that the turning direction side indicated by the turn sign of the other vehicle is the right side. When determining that at least one orange light spot having luminance higher than the predetermined luminance blinks at predetermined time intervals on the left side of the center between the pair of light spots, the detection unit outputs a signal indicating that the left turn lamp of the preceding vehicle is blinking to the determination unit 25. The signal indicating that the left turn lamp of the preceding vehicle is blinking is a signal indicating that the other vehicle is going to turn to the left when viewed from the vehicle 100, and is a signal indicating that the turning direction side indicated by the turn sign of the other vehicle is the left side.

The predetermined time interval of the turn lamp described above is a time interval defined by laws and regulations, and is a time interval of approximately 0.5 seconds to approximately 1.0 seconds. For example, the time interval may be 0.67 seconds.

On the other hand, the detection unit does not output a signal in a case where there is no pair of light spots having luminance higher than predetermined luminance located at a predetermined interval in the horizontal direction in the captured image.

Examples of the configuration of the detection unit include the same configuration as the control unit CO.

Note that the configuration of the detection device 20, the method of detecting another vehicle by the detection device 20, the method of calculating the distance from the vehicle 100 to another vehicle, the method of identifying an oncoming vehicle and a preceding vehicle, and the method of identifying whether or not the turn lamp is blinking are not particularly limited. For example, the detection device 20 may perform image processing on the captured image captured by the camera, and determine whether or not the pair of light spots and the light spot of the turn lamp exist in the captured image captured by the camera on the basis of information obtained by the image processing. Furthermore, the detection device 20 may further include a millimeter-wave radar, a LIDAR, or the like capable of detecting an object located in front of the vehicle 100, and may detect the presence of another vehicle located in front of the vehicle 100, the position of the other vehicle with respect to the vehicle 100, and identify whether the detected other vehicle is a preceding vehicle or an oncoming vehicle on the basis of a captured image captured by a camera and a signal input from the millimeter-wave radar, the LIDAR, or the like.

Figure 4:
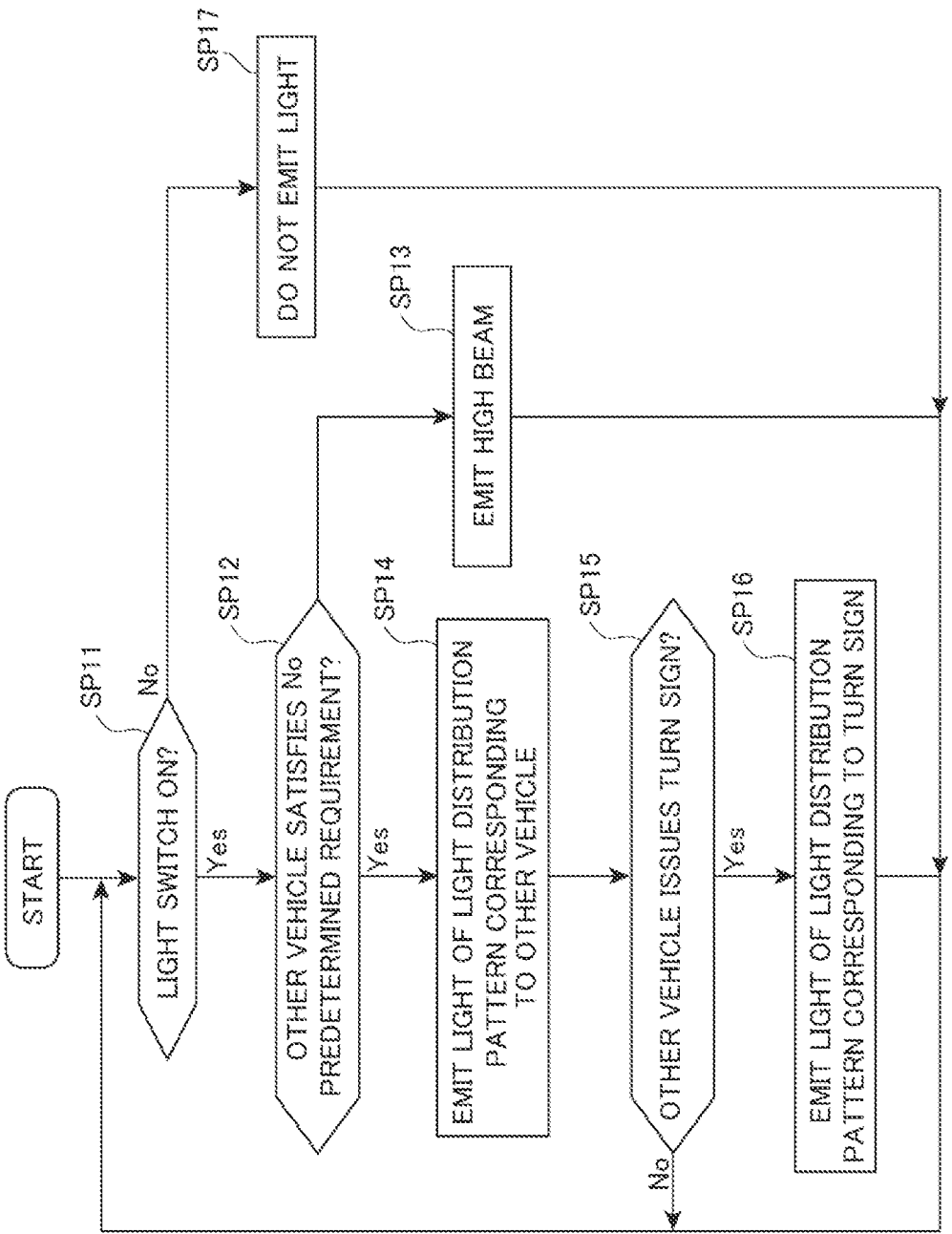
FIG. 4 is a diagram illustrating an example of a control flowchart of a control unit according to the first embodiment.

Next, operations of the vehicle headlight 1 and the vehicle headlight system 2 of the present embodiment will be described. FIG. 4 is a diagram illustrating an example of a control flowchart of the control unit CO in the present embodiment. As illustrated in FIG. 4, the control flow of the present embodiment includes steps SP11 to SP17.

(Step SP11)

First, the control unit CO determines whether a signal indicating emission of light is input from the light switch 35. When this signal is input to the control unit CO, the control unit CO advances the control flow to step SP12. On the other hand, when this signal is not input to the control unit CO, the control unit CO advances the control flow to step SP17. For this reason, the determination of the control unit CO can be understood as changing the step to proceed to the next in a case-by-case manner according to the input signal.

(Step SP12)

In this step, the control unit CO determines whether the other vehicle detected by the detection device 20 satisfies a predetermined requirement based on the signal input from the determination unit 25. As described above, when the other vehicle detected by the detection device 20 satisfies the predetermined requirement and a signal indicating that the other vehicle is a preceding vehicle is input from the detection device 20, the determination unit 25 generates a signal indicating the preceding vehicle as a signal indicating the other vehicle and outputs the signal to the control unit CO. When the other vehicle satisfies the predetermined requirement and a signal indicating that the other vehicle is an oncoming vehicle is input from the detection device 20, the determination unit 25 generates a signal indicating an oncoming vehicle as a signal indicating the other vehicle and outputs the signal to the control unit CO. When a signal indicating another vehicle is input, the control unit CO advances the control flow to step SP14. Note that, in this step, a signal indicating the distance from the vehicle 100 to the other vehicle and the position of the pair of luminous points in the captured image as information on the position of the other vehicle with respect to the vehicle 100 is also input to the control unit CO.

On the other hand, when no signal indicating another vehicle is input, the control unit CO advances the control flow to step SP13. When no other vehicle is detected by the detection device 20, no signal is input from the detection device 20 to the determination unit 25, and the determination unit 25 does not output a signal to the control unit CO. Therefore, also in such a case, the control flow proceeds to step SP13.

(Step SP13)

In this step, the control unit CO controls the light emitting unit 10 so that a high beam is emitted from the vehicle headlight 1. Specifically, the control unit CO refers to the information stored in the memory ME, and outputs a signal based on the power supplied to each light emitting element 13 in the light distribution pattern of the high beam to the power supply circuit 30. As a result, the power supplied to each light emitting element 13 is adjusted by the driver of the power supply circuit 30 so as to generate light having a high-beam light distribution pattern, and light having a high-beam light distribution pattern is emitted from the vehicle headlight 1. Then, the control unit CO returns the control flow to step SP11.

Figure 5:
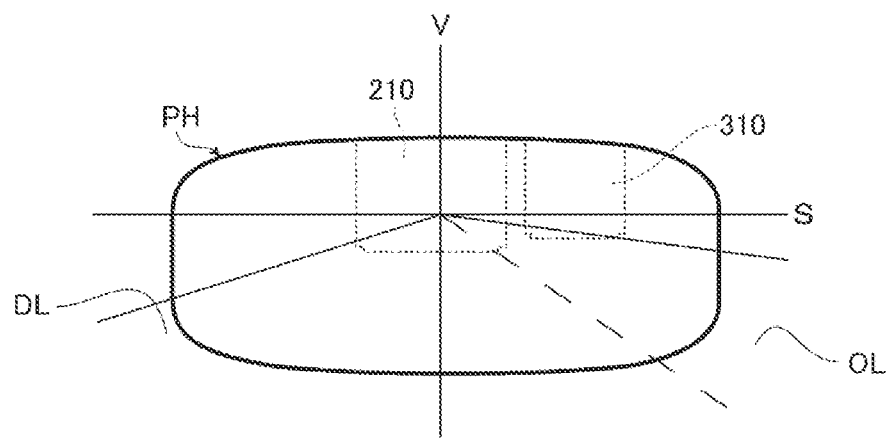
FIG. 5 is a view illustrating a light distribution pattern of a high beam.

FIG. 5 is a diagram illustrating a light distribution pattern of a high beam. In FIG. 5, S represents a horizontal line, V represents a vertical line passing through the center of the vehicle 100 in the horizontal direction, and a light distribution pattern PH of a high beam formed on a virtual vertical screen arranged 25 meters ahead of the vehicle 100 is indicated by a thick line. In the present embodiment, as illustrated in FIG. 5, the opposite lane OL or the overtaking lane OL is located on the right side of the traveling lane DL of the vehicle 100, and the vehicle 100 travels on the left side. The hot zone, which is a region having the highest light intensity in the light distribution pattern PH of the high beam, is located on or near the intersection of the horizontal line S and the vertical line V. The intensity of light in the light distribution pattern PH of the high beam decreases as it goes away outward from the hot zone. In FIG. 5, a light reduction region 210, 310 to be described later is indicated by a dotted line.

(Step SP14)

In this step, the control unit CO controls the light emitting unit 10 so that the light distribution pattern of the light emitted from the vehicle headlight 1 becomes a light distribution pattern corresponding to another vehicle detected by the detection device 20. Specifically, the control unit CO refers to the table stored in the memory ME on the basis of a signal indicating another vehicle, a distance from the vehicle 100 to the other vehicle, and a signal indicating the position of the pair of luminous points in the captured image. Then, the control unit CO outputs, to the power supply circuit 30, a signal based on the power supplied to each light emitting element 13 in the light distribution pattern corresponding to the information on the other vehicle. As a result, the power supplied to each light emitting element 13 is adjusted by the driver of the power supply circuit 30 so as to generate light of a light distribution pattern according to information on another vehicle, and light of the light distribution pattern is emitted from the vehicle headlight 1. Then, the control unit CO advances the control flow to step SP15.

Figure 6:
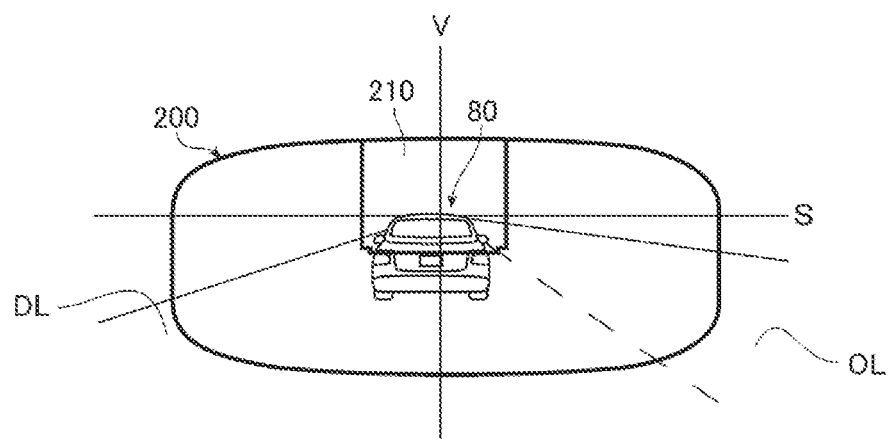
FIG. 6 is a diagram illustrating an example of a light distribution pattern of light emitted when a preceding vehicle is detected by the detection device.

FIG. 6 is a diagram illustrating an example of a light distribution pattern of light emitted when a preceding vehicle is detected by the detection device 20. In FIG. 6, S represents a horizontal line, V represents a vertical line passing through the center of the vehicle 100 in the horizontal direction, and a light distribution pattern 200 formed on a virtual vertical screen arranged 25 meters ahead of the vehicle 100 is indicated by a thick line. The lane DL illustrated in FIG. 6 is a traveling lane, and the lane OL is an overtaking lane.

In the present embodiment, the shape of the light distribution pattern 200 is the same as the shape of the light distribution pattern PH of the high beam illustrated in FIG. 5, but the light reduction region 210 is formed in a portion of the light distribution pattern. The total light flux amount of the light from the light emitting unit 10 irradiated to the light reduction region 210 is smaller than the total light flux amount of the light from the light emitting unit 10 irradiated to the region corresponding to the light reduction region 210 in the high-beam light distribution pattern PH. In addition, the intensity of light in the light reduction region 210 is lower than a predetermined reference intensity. In the present embodiment, the intensity of light in the light reduction region 210 is substantially constant. Note that the light reduction region 210 may be a region that is not irradiated with light. Therefore, the light reduction region 210 is a region in which the total light flux amount of the light from the light emitting unit 10 decreases as compared with that before the signal indicating another vehicle is input. On the other hand, the light intensity distribution in the region other than the light reduction region 210 in the light distribution pattern 200 is substantially the same as the light intensity distribution in the region other than the region corresponding to the light reduction region 210 in the light distribution pattern PH. Therefore, the region other than the light reduction region 210 in the light distribution pattern 200 is a region in which the total light flux amount of the light from the light emitting unit 10 is not reduced, and is brighter than the light reduction region 210.

Figure 7:
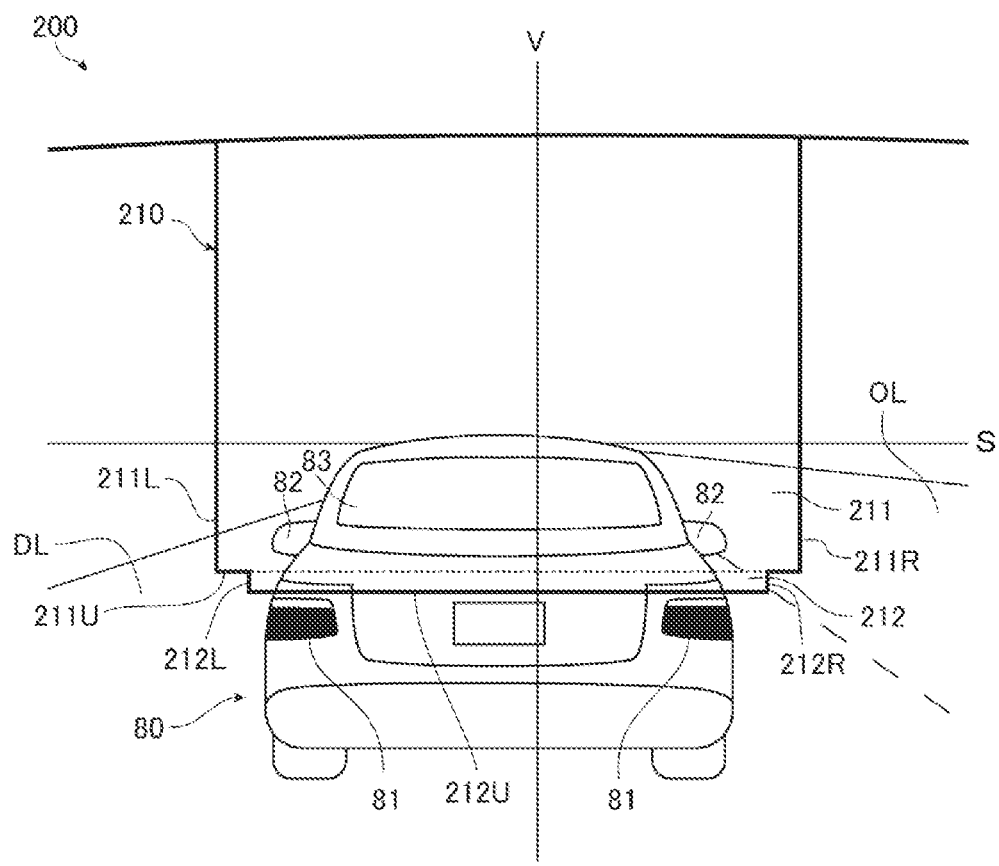
FIG. 7 is an enlarged view illustrating a light reduction region and the vicinity thereof in the light distribution pattern illustrated in FIG. 6.

FIG. 7 is an enlarged view of the light reduction region 210 and the vicinity thereof in the light distribution pattern 200. As illustrated in FIG. 7, the light reduction region 210 crosses a portion of the preceding vehicle 80 in the horizontal direction, and overlaps with a portion above the tail light 81 in the portion of the preceding vehicle 80. The light reduction region 210 of the present embodiment includes a first region 211 and a second region 212. Note that, in FIG. 7, a boundary between the first region 211 and the second region 212 is indicated by a dotted line, and a pair of red light spots reflected in the captured image by the light from the tail lamp 81 is indicated in black.

The first region 211 is a region that crosses the preceding vehicle 80 above the second region 212, and overlaps with the entire side mirror 82 and the entire rear-view mirror 83 of the preceding vehicle 80. The side mirror 82 and the rear-view mirror 83 are visual recognition portions for the driver of the preceding vehicle 80 to visually recognize the rear of the outside of the vehicle. A lower edge 211U of the first region 211 extends substantially linearly in the horizontal direction.

The second region 212 is a region crossing the preceding vehicle 80 below the first region 211, and is connected to a lower edge 211U of the first region 211. The second region 212 extends in a band shape in the horizontal direction and is located at the lowermost position in the light reduction region 210. A lower edge 212U of the second region 212 extends substantially linearly in the horizontal direction. The left edge 212L of the second region 212 is located on the right side of the left edge 211L of the first region 211, and is located between the left edge 211L of the first region and the preceding vehicle 80. The right edge 212R of the second region 212 is located on the left side of the right edge 211R of the first region 211, and is located between the right edge 211R of the first region 211 and the preceding vehicle 80. Therefore, the width of the second region 212 in the horizontal direction is smaller than the width of the first region 211 in the horizontal direction. In the present embodiment, the width in the horizontal direction from the left edge 211L of the first region 211 to the preceding vehicle 80 is smaller than the width in the horizontal direction from the right edge 211R of the first region 211 to the preceding vehicle 80. Note that the width in the horizontal direction from the left edge 211L of the first region 211 to the preceding vehicle 80 may be the same as or larger than the width in the horizontal direction from the right edge 211R of the first region 211 to the preceding vehicle 80.

In the present embodiment, the width of the first region 211 and the width of the second region 212 change according to the distance from the vehicle 100 to the preceding vehicle 80, and these widths decrease as the distance from the vehicle 100 to the preceding vehicle 80 increases. Furthermore, the positions of the first region 211 and the second region 212 integrally change according to the position of the preceding vehicle 80 with respect to the vehicle 100. In the present embodiment, a table stored in the memory ME is configured such that such a light distribution pattern 200 is formed.

The positions of the side mirror 82 and the rear-view mirror 83 where the driver visually recognizes the rear vary depending on the type of vehicle. However, in general, the side mirror 82 and the rear-view mirror 83, which are visual recognition portions, are located in a region above the tail light 81 of the preceding vehicle 80, and a gap is formed in the vertical direction between the tail light 81 and the visual recognition portion. As described above, the detection device 20 can detect the position of the tail light 81 of the preceding vehicle 80. Therefore, even in a case where the visual recognition portion is not detected, the information on the power supplied to the light emitting element 13 for forming the light distribution pattern 200 having the light reduction region 210 is stored in the memory ME in advance according to the position of the tail lamp 81 of the preceding vehicle 80, whereby the light distribution pattern 200 as described above can be formed.

Figure 8:
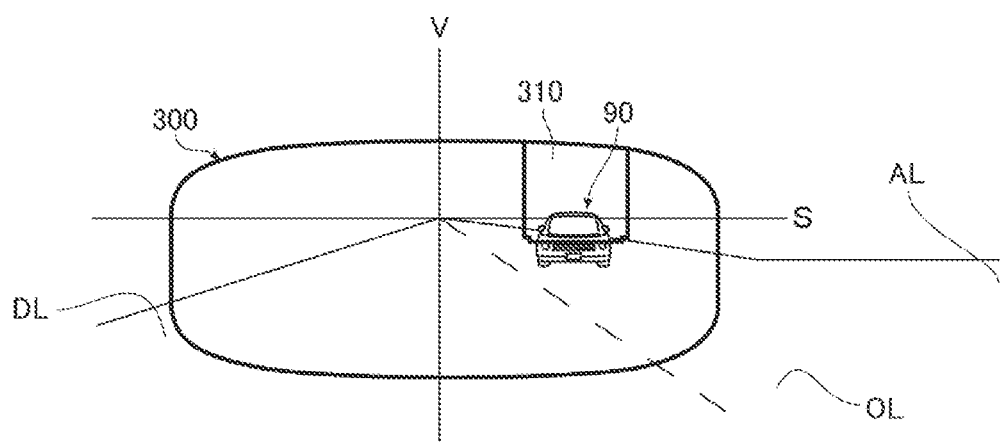
FIG. 8 is a diagram illustrating an example of a light distribution pattern of light emitted when an oncoming vehicle is detected by the detection device.

FIG. 8 is a diagram illustrating an example of a light distribution pattern of light emitted when an oncoming vehicle is detected by the detection device 20. In FIG. 8, S indicates a horizontal line, V indicates a vertical line passing through the center of the vehicle 100 in the horizontal direction, and a light distribution pattern 300 formed on a virtual vertical screen arranged 25 meters ahead of the vehicle 100 is indicated by a thick line. The lane OL illustrated in FIG. 8 is an opposite lane, and another road AL extending substantially perpendicularly to the opposite lane OL is connected to the opposite lane OL. Therefore, the oncoming vehicle 90 traveling in the opposite lane OL can turn left and travel on the road AL. When the oncoming vehicle 90 turns left, it is recognized that the oncoming vehicle 90 is turning right when viewed from the vehicle 100.

In the present embodiment, the shape of the light distribution pattern 300 is the same as the shape of the light distribution pattern PH of the high beam illustrated in FIG. 5, but the light reduction region 310 is formed in a portion of the light distribution pattern. The total light flux amount of the light from the light emitting unit 10 irradiated to the light reduction region 310 is smaller than the total light flux amount of the light from the light emitting unit 10 irradiated to the region corresponding to the light reduction region 310 in the high-beam light distribution pattern PH. In addition, the intensity of light in the light reduction region 310 is lower than a predetermined reference intensity. In the present embodiment, the intensity of light in the light reduction region is substantially constant. Note that the light reduction region 310 may be a region that is not irradiated with light. Therefore, the light reduction region 310 is a region in which the total light flux amount of the light from the light emitting unit 10 decreases as compared with that before the signal indicating another vehicle is input. On the other hand, the light intensity distribution in the region other than the light reduction region 310 in the light distribution pattern 300 is substantially the same as the light intensity distribution in the region other than the region corresponding to the light reduction region 310 in the light distribution pattern PH. Therefore, the region other than the light reduction region 310 in the light distribution pattern 300 is a region in which the total light flux amount of the light from the light emitting unit 10 is not reduced, and is brighter than the light reduction region 210.

Figure 9:
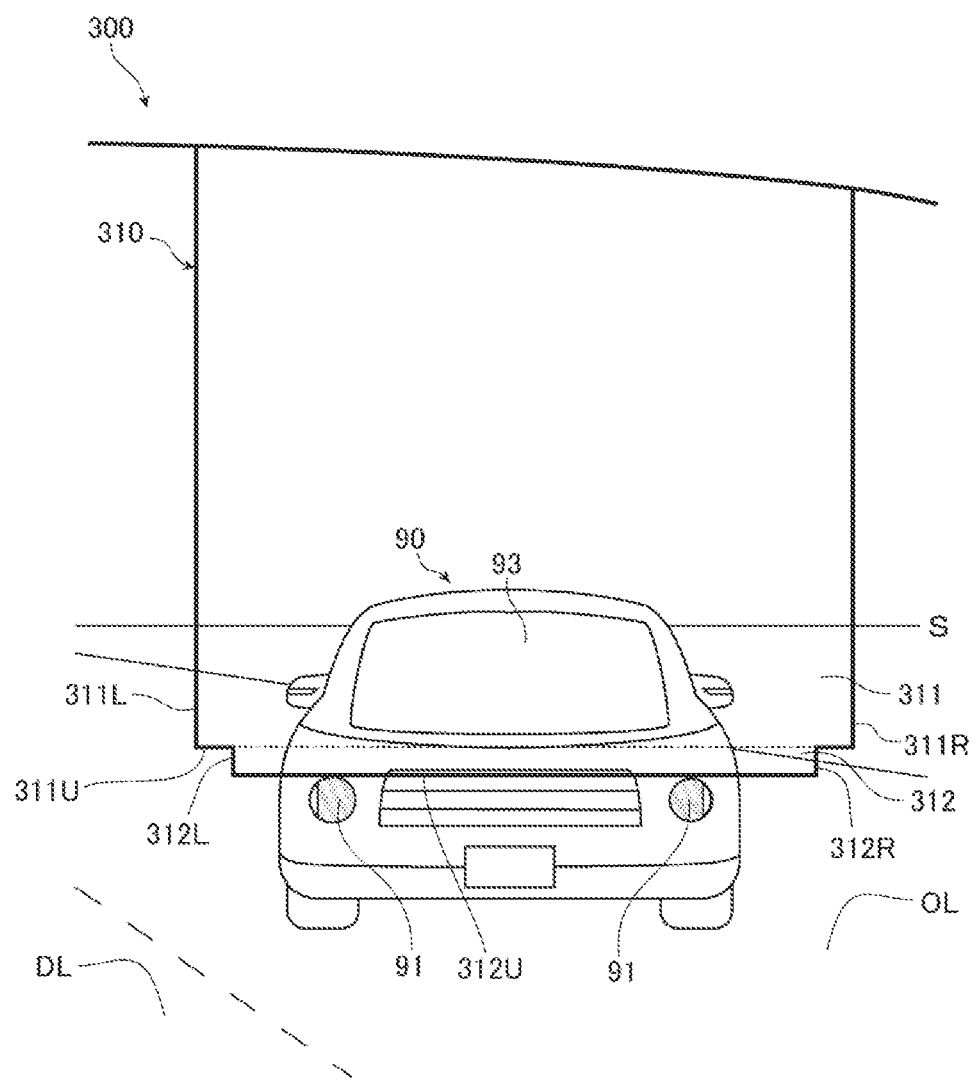
FIG. 9 is an enlarged view illustrating a light reduction region and the vicinity thereof in the light distribution pattern illustrated in FIG. 8.

FIG. 9 is an enlarged view of the light reduction region 310 and the vicinity thereof in the light distribution pattern 300. As illustrated in FIG. 9, the light reduction region 310 crosses a portion of the oncoming vehicle 90 in the horizontal direction and overlaps with a portion above the headlight 91 in the portion of the oncoming vehicle 90. The light reduction region 310 of the present embodiment includes a first region 311 and a second region 312. Note that, in FIG. 9, a boundary between the first region 311 and the second region 312 is indicated by a dotted line, and a pair of white light spots reflected in the captured image by the light from the headlight 91 is indicated by hatching.

The first region 311 is a region that crosses the oncoming vehicle 90 above the second region 312 and overlaps with the entire front window 93 of the oncoming vehicle 90. The front window 93 is a visual recognition portion for the driver of the oncoming vehicle 90 to view the front outside the vehicle. A lower edge 311U of the first region 311 extends substantially linearly in the horizontal direction.

The second region 312 is a region that crosses the oncoming vehicle 90 below the first region 311, and is connected to the lower side of the first region 311. The second region 312 extends in a band shape in the horizontal direction and is located at the lowermost position in the light reduction region 310. A lower edge 312U of the second region 312 extends substantially linearly in the horizontal direction. The left edge 312L of the second region 312 is located closer to the oncoming vehicle 90 than the left edge 311L of the first region 311, and the right edge 312R of the second region 312 is located closer to the oncoming vehicle 90 than the right edge 311R of the first region 311. Therefore, the width of the second region 312 in the horizontal direction is smaller than the width of the first region 311 in the horizontal direction. In the present embodiment, the width in the horizontal direction from the right edge 311R of the first region 311 to the oncoming vehicle 90 is larger than the width from the left edge 311L of the first region 311 to the oncoming vehicle 90. Note that the width in the horizontal direction from the right edge 311R of the first region 311 to the oncoming vehicle 90 may be the same as or smaller than the width from the left edge 311L of the first region 311 to the oncoming vehicle 90.

In the present embodiment, the width of the first region 311 and the width of the second region 312 change according to the distance from the vehicle 100 to the oncoming vehicle 90 detected by the detection device 20, and these widths decrease as the distance from the vehicle 100 to the oncoming vehicle 90 increases. In addition, the positions of the first region 211 and the second region 212 integrally change and the widths thereof change according to the direction of the oncoming vehicle 90 with respect to the vehicle 100. In the present embodiment, a table stored in the memory ME is configured such that such a light distribution pattern 300 is formed. Note that the width from the right edge 311R of the first region 311 to the oncoming vehicle 90 may be increased as the distance from the vehicle 100 to the oncoming vehicle 90 decreases.

The position of the front window 93 where the driver visually recognizes the front varies depending on the type of vehicle. However, in general, the front window 93, which is a visual recognition portion, is located in a region above the headlight 91 of the oncoming vehicle 90, and a gap is formed in the vertical direction between the headlight 91 and the visual recognition portion. As described above, the detection device 20 can detect the position of the headlight 91 of the oncoming vehicle 90. Therefore, even when the visual recognition portion that visually recognizes the front of the oncoming vehicle 90 is not detected, the light distribution pattern 200 as described above can be formed by storing information on the power supplied to the light emitting element 13 to form the light distribution pattern 300 having the light reduction region 310 in the memory ME in advance according to the position of the headlight 91 of the oncoming vehicle 90.

As described above, in this step, the control unit CO controls the light emitting unit 10 so that the region including the first region 211, 311 overlapping with all the visual recognition portions of the other vehicle in the light distribution pattern becomes the light reduction region 210, 310 in which the total light flux amount of the light from the light emitting unit 10 decreases as compared with before the signal indicating the other vehicle is input.

Next, steps SP15 and SP16 for changing the light distribution pattern in accordance with the turn sign of the other vehicle will be described.

First, steps SP15 and 16 will be described with an example in which the other vehicle is a preceding vehicle.
(Step SP15)

Figure 10:
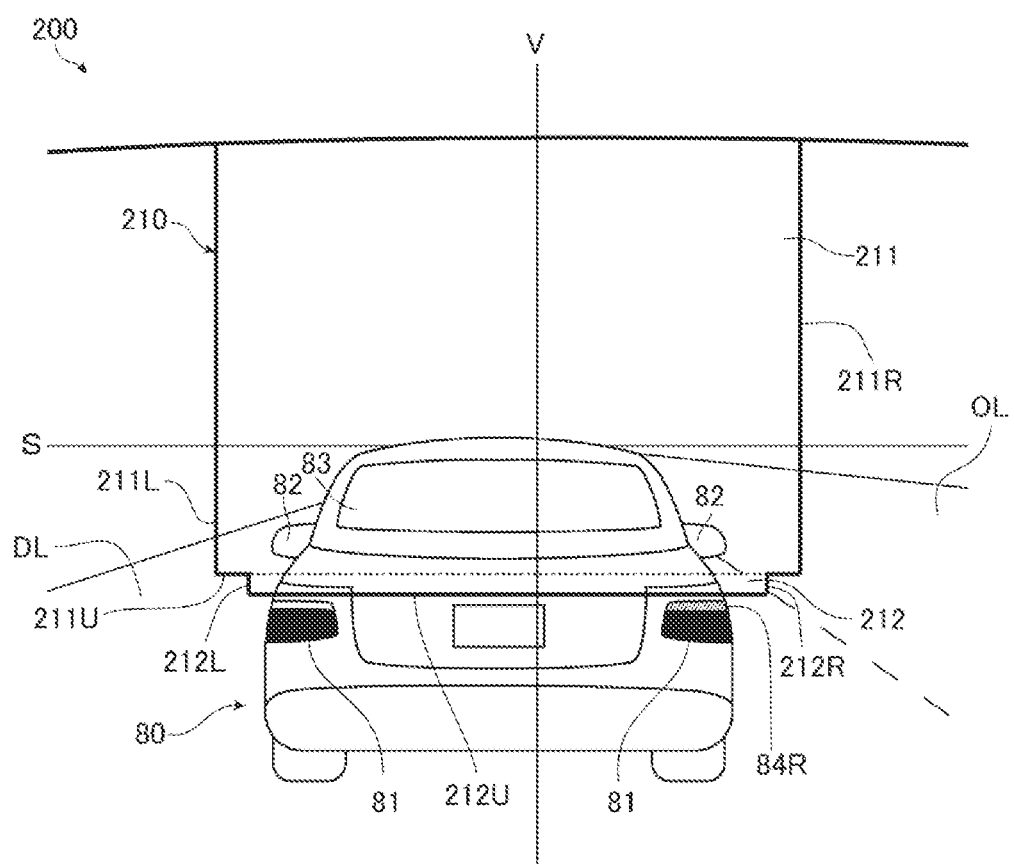
FIG. 10 is a view illustrating a state in which a turn lamp of a preceding vehicle blinks from the same viewpoint as FIG. 7.

This step is a step of determining whether or not another vehicle issues a turn sign. FIG. 10 is a diagram illustrating a state in which the right turn lamp of the preceding vehicle 80 blinks from the same viewpoint as FIG. 7.

For example, it is assumed that, when the vehicle 100 and the preceding vehicle 80 are traveling in the traveling lane DL, the right turn lamp 84R is blinked so that the preceding vehicle 80 moves to the overtaking lane OL. As illustrated in FIG. 10, the driver of the preceding vehicle 80 blinks the right turn lamp 84R to issue a turn sign that the preceding vehicle 80 turns right to the driver of the vehicle 100 or the like. In this case, in the captured image captured by the camera of the detection device 20 of the vehicle 100, in addition to the pair of red light spots due to the light emitted from the tail light 81 of the preceding vehicle 80, one orange light spot due to the light emitted from the right turn lamp 84R appears at predetermined time intervals. Note that, in FIG. 10, a red light spot is indicated by black, and an orange light spot is indicated by hatching. The orange light spot is located on the right side of the center between the pair of red light spots. Therefore, as described above, the detection unit of the detection device 20 outputs the signal indicating the blinking of the right turn lamp 84R of the preceding vehicle 80 to the determination unit 25. As described above, this signal is a signal indicating that the preceding vehicle 80 is going to turn right as viewed from the vehicle 100. In the present embodiment, as described above, a signal indicating a preceding vehicle is input to the determination unit 25. Therefore, the determination unit 25 determines that the right turn lamp of the preceding vehicle 80 is blinking, generates a signal indicating blinking of the right turn lamp of the preceding vehicle 80 as a signal indicating a turn sign of another vehicle, and outputs the signal to the control unit CO. This signal is a signal indicating that the turning direction side indicated by the turn sign of the preceding vehicle 80 is the right side as viewed from the vehicle 100. When a signal indicating a turn sign of another vehicle is further input in addition to a signal indicating another vehicle, the control unit CO advances the control flow to step SP16.

On the other hand, when the signal indicating the blinking of the turn lamp of the preceding vehicle 80 is not input to the control unit CO, the control unit CO returns the control flow to step SP11.
(Step SP16)

Figure 11:
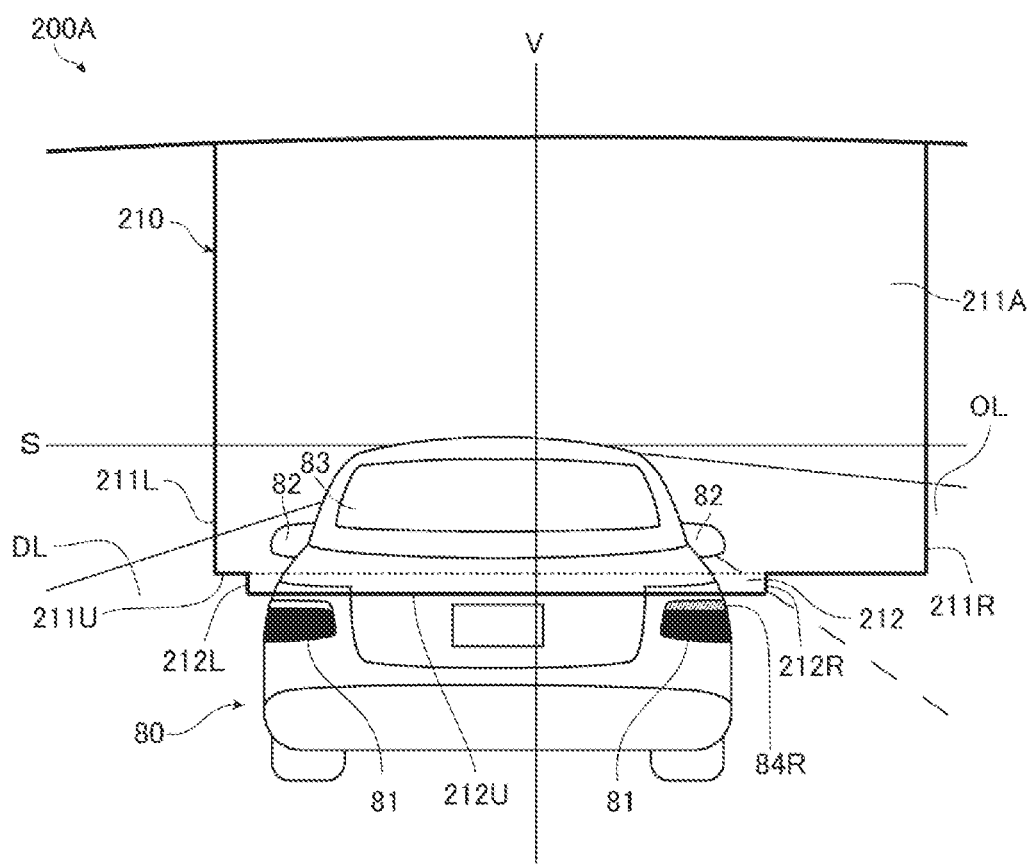
FIG. 11 is a view illustrating a state in which the light distribution pattern illustrated in FIG. 7 is changed from the same viewpoint as FIG. 7.

This step is a step of emitting light for forming a light distribution pattern according to the turn sign. FIG. 11 is a view illustrating a state in which the light distribution pattern illustrated in FIG. 7 is changed from the same viewpoint as FIG. 7. The light distribution pattern 200A illustrated in FIG. 11 is a light distribution pattern stored in the memory ME as one of the light distribution patterns according to the turn sign, and the first region 211 of the light reduction region 210 illustrated in FIG. 7 includes the first region 211A expanded to the right side compared with that before the determination unit 25 makes the determination in Step SP15. The second region 212 of the light distribution pattern 200A illustrated in FIG. 11 is similar to the second region 212 of the light distribution pattern 200 illustrated in FIG. 7, and does not change from the state of step SP14.

When the signal indicating the blinking of the right turn lamp of the preceding vehicle 80 is input, the control unit CO refers to the table stored in the memory ME, and outputs a control signal for forming the light distribution pattern 200A to the power supply circuit 30. Then, predetermined power is supplied to each light emitting element 13 by the operation of the driver based on the control signal. As a result, light for forming the light distribution pattern 200A is generated in the light emitting unit 10, and light to be the light distribution pattern 200A is emitted from the vehicle headlight 1. In this way, the first region 211 in the light reduction region 210 expands toward the right side of the visual recognition portion of the preceding vehicle 80 as viewed from the vehicle 100, as compared with after the signal indicating the other vehicle is input to the control unit CO and before the signal indicating the turn sign of the other vehicle is input to the control unit CO. In this case, the right side of the visual recognition portion of the preceding vehicle 80 as viewed from the vehicle 100 corresponds to the turning direction side indicated by the turn sign. Then, the control unit CO returns the control flow to step SP11.

Note that, in the example of steps SP15 and 16 described above, the example in which the preceding vehicle 80 is going to turn right has been described. However, in a case where the preceding vehicle 80 is going to turn left, the light distribution pattern is changed such that the first region 211 expands toward the left side of the visual recognition portion of the preceding vehicle 80 as viewed from the vehicle 100.

Next, steps SP15 and 16 will be described as an example in which the other vehicle is an oncoming vehicle.
(Step SP15)

Figure 12:
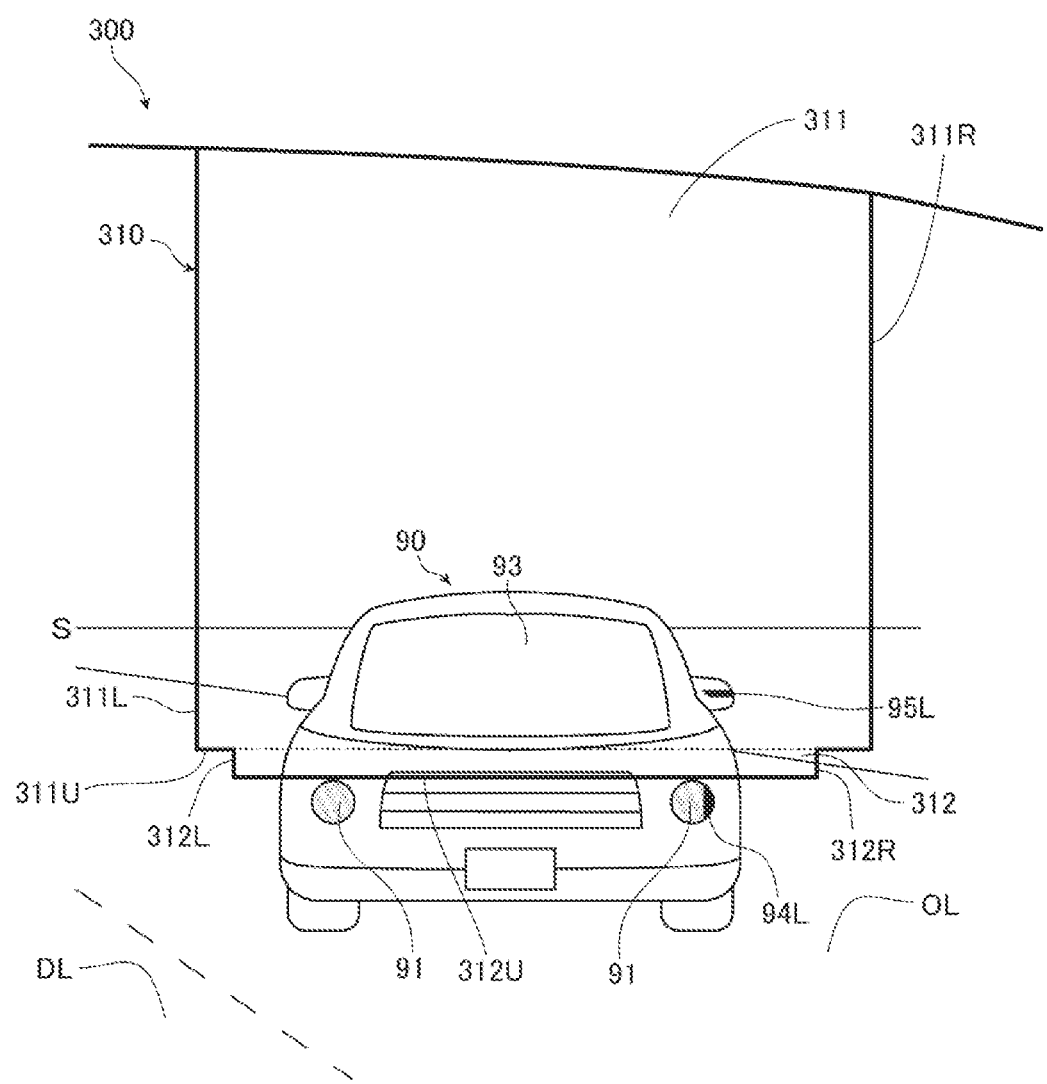
FIG. 12 is a view illustrating a state in which a turn lamp of an oncoming vehicle blinks from the same viewpoint as FIG. 9.

FIG. 12 is a diagram illustrating a state in which the right turn lamp of the oncoming vehicle 90 blinks from the same viewpoint as FIG. 9. For example, it is assumed that the left turn lamps 94L and 95L blink in order for the oncoming vehicle 90, which is another vehicle, to turn left on the road AL. As illustrated in FIG. 12, the left turn lamp 94L is provided in a portion of the headlight 91 on the left side of the oncoming vehicle 90, and the left turn lamp 95L is provided in the cover of the left side mirror of the oncoming vehicle 90. The left turn lamps 94L and 95L blink synchronously. The driver of the oncoming vehicle 90 blinks the left turn lamps 94L and 95L to issue a turn sign that the oncoming vehicle 90 turns left to the driver of the vehicle 100 or the like. When viewed from the vehicle 100, it is recognized that the oncoming vehicle 90 is going to turn right. In this case, in the captured image captured by the camera of the detection device 20 of the vehicle 100, in addition to the pair of white light spots due to the light emitted from the headlight 91 of the oncoming vehicle 90, two orange light spots due to the light emitted from the left turn lamps 94L and 95L are displayed at predetermined time intervals. Note that, in FIG. 12, a white light spot is indicated by hatching, and an orange light spot is indicated by black. The orange light spot is located on the right side of the center between the pair of white light spots. Therefore, as described above, the detection unit of the detection device 20 outputs the signal indicating the blinking of the left turn lamp of the oncoming vehicle 90 to the determination unit 25. As described above, this signal is a signal indicating that the oncoming vehicle 90 is going to turn right as viewed from the vehicle 100. In the present embodiment, as described above, a signal indicating an oncoming vehicle is input to the determination unit 25. Therefore, the determination unit 25 determines that the left turn lamp of the oncoming vehicle 90 is blinking, and outputs a signal indicating turning on of the left turn lamp of the oncoming vehicle 90 to the control unit CO as a signal indicating turn sign of another vehicle. This signal is a signal indicating that the turning direction side indicated by the turn sign of the oncoming vehicle 90 is the right side as viewed from the vehicle 100. When this signal is input to the control unit CO, the control unit CO advances the processing to step SP16.

On the other hand, when the signal indicating the blinking of the turn lamp of the oncoming vehicle 90 is not input to the control unit CO, the control unit CO returns the control flow to step SP11.

(Step SP16)

Figure 13:
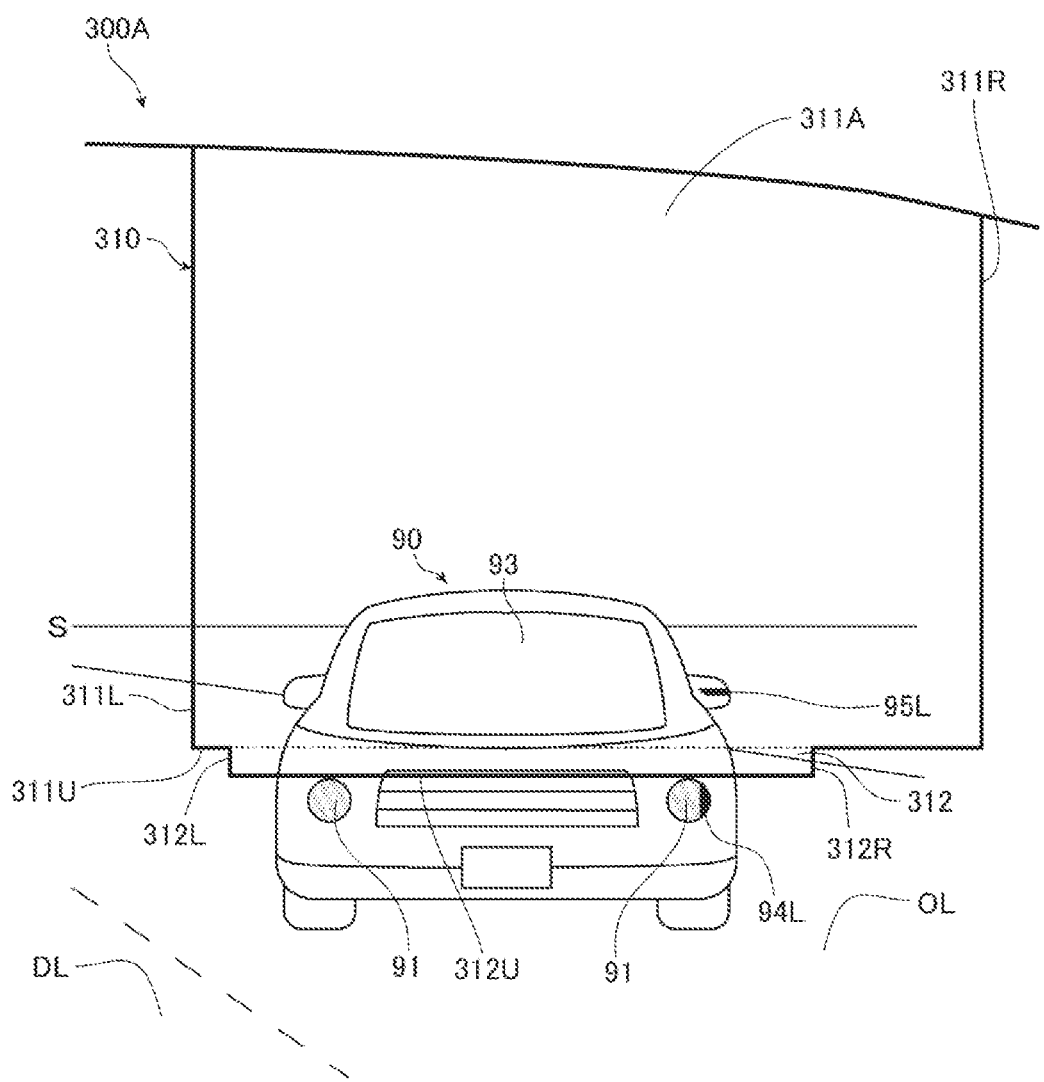
FIG. 13 is a view illustrating a state in which the light distribution pattern illustrated in FIG. 9 is changed from the same viewpoint as FIG. 9.

FIG. 13 is a view illustrating a state in which the light distribution pattern illustrated in FIG. 9 is changed from the same viewpoint as FIG. 9. A light distribution pattern 300A illustrated in FIG. 13 is a light distribution pattern stored in the memory ME as one of the light distribution patterns according to the turn sign, and includes a first region 311A in which the first region 311 of the light reduction region 310 illustrated in FIG. 9 expands to the right side. The second region 312 of the light distribution pattern 300 shown in FIG. 13 is similar to the second region 312 of the light distribution pattern 300 shown in FIG. 9.

When a signal indicating blinking of the left turn lamp of the oncoming vehicle 90 is input, the control unit CO refers to the table stored in the memory ME, and outputs a control signal for forming the light distribution pattern 300A to the power supply circuit 30. By the operation of the driver based on the control signal, predetermined power is supplied to each light emitting element 13. As a result, light for forming the light distribution pattern 300A is generated in the light emitting unit 10, and light to be the light distribution pattern 300A is emitted from the vehicle headlight 1. In this way, the first region 311 in the light reduction region 310 expands toward the right side of the visual recognition portion of the oncoming vehicle 90 as viewed from the vehicle 100, as compared with after the signal indicating the other vehicle is input to the control unit CO and before the signal indicating the turn sign of the other vehicle is input to the control unit CO. In this case, the right side of the visual recognition portion of the oncoming vehicle 90 as viewed from the vehicle 100 corresponds to the turning direction side indicated by the turn sign. Then, the control unit CO returns the control flow to step SP11.

Note that, in the example of steps SP15 and 16 described above, the example in which the oncoming vehicle 90 is going to turn right as viewed from the vehicle 100 has been described. However, in a case where the oncoming vehicle 90 is going to turn left as viewed from the vehicle 100, the light distribution pattern is changed such that the first region 311 expands toward the left side of the visual recognition portion of the oncoming vehicle 90 as viewed from the vehicle 100.

As described above, in steps SP15 and 16, the control unit CO controls the light emitting unit 10 so that the first region 211, 311 in the light reduction region 210, 310 expands to the turning direction side indicated by the turn sign after the signal indicating the other vehicle is input and before the signal indicating the turn sign of the other vehicle is input. (Step SP17)

In this step, no signal is input from the light switch 35 to the control unit CO. Therefore, the light switch 35 is in an off state. The control unit CO outputs a predetermined signal to the power supply circuit 30, causes the power supply circuit 30 to stop the supply of power to each light emitting element 13, does not emit light from the vehicle headlight 1, and returns the control flow to step SP11.

As described above, the light distribution pattern of the light emitted from the vehicle headlight 1 is changed when the preceding vehicle 80 or the oncoming vehicle 90 issues a turn sign by blinking the turn lamp. Note that the control flow of the control unit CO is not limited to the control flow illustrated in FIG. 4.

As described above, the vehicle headlight system 2 of the present embodiment includes the detection device 20 that detects the other vehicle 80, 90 and the vehicle headlight 1. In addition, the vehicle headlight 1 includes a light emitting unit 10 that emits light of a light distribution pattern changeable toward other vehicle 80, 90 located in front of the vehicle 100, a determination unit 25 that determines information from the detection device 20 and generates a signal indicating the other vehicle 80, 90 and a signal indicating a turn sign of the other vehicle 80, 90, and a control unit CO to which a signal indicating the other vehicle 80, 90 and a signal indicating a turn sign of the other vehicle 80, 90 are input. The control unit CO controls the light emitting unit 10 so that, when a signal indicating the other vehicle 80, 90 is input, a region including the first region 211, 311 overlapping with all of the visual recognition portions of the other vehicle 80, 90 in the light distribution pattern becomes a light reduction region 210, 310 in which a total luminous flux amount of light from the light emitting unit 10 decreases as compared with that before the signal indicating the other vehicle 80, 90 is input, and controls the light emitting unit 10 so that, when a signal indicating a turn sign of the other vehicle 80, 90 is further input in addition to the signal indicating the other vehicle 80, 90, the first region 211, 311 of the light reduction region 210, 310 expands to the turning direction side indicated by the turn sign as compared with that after the signal indicating the other vehicle is input and before the signal indicating the turn sign of the other vehicle is input.

According to the vehicle headlight 1 and the vehicle headlight system 2 as described above, when a signal indicating a turn sign of the other vehicle 80, 90 is input to the control unit CO, the first region 211, 311 overlapping with the visual recognition portion in the light reduction region 210, 310 expands to the turning direction side indicated by the turn sign of the other vehicle 80, 90, as compared with after the signal indicating the other vehicle is input and before the signal indicating the turn sign of the other vehicle is input. For this reason, in the light distribution pattern, a region where the line of sight of the driver of each of the other vehicle 80, 90 moves may be darker than other regions of the light distribution pattern. Therefore, according to the vehicle headlight 1, it is possible to suppress dazzling of the drivers of the other vehicle 80, 90 when the other vehicle 80, 90 turn.

In addition, the light reduction region 210, 310 formed by the vehicle headlight 1 of the present embodiment has a second region 212, 312 located below the first region 211, 311. Therefore, the width of the light reduction region in the horizontal direction is narrowed below the visual recognition portions of the other vehicle 80, 90, and the proportion of the bright region in the light distribution pattern is large. Therefore, forward visibility of the vehicle 100 that is the host vehicle can be improved. In addition, there is a strong tendency that a region below the visual recognition portions of the other vehicle 80, 90 does not touch the line of sight of the driver of the other vehicle. Therefore, even if the second region 212, 312 is formed in this way, dazzling of the drivers of the other vehicle 80, 90 can be suppressed.

Furthermore, since the light reduction region 210, 310 of the present embodiment is irradiated with a certain degree of light, the light reduction region 210, 310 has a certain degree of brightness. Therefore, as compared with a case where the light reduction region 210, 310 is not irradiated with light, it is possible to improve the forward visibility of the driver of the vehicle 100 that is the host vehicle while suppressing dazzling of the driver of the other vehicle 80, 90. On the other hand, when the light reduction region 210, 310 is not irradiated with light, it is possible to further suppress dazzling of the drivers of the other vehicle 80, 90.

In addition, the determination unit 25 of the present embodiment determines the distance to the other vehicle 80, 90 on the basis of the information from the detection device 20, and outputs a signal indicating the other vehicle to the control unit CO when the distance is equal to or less than a predetermined distance. Generally, dazzling to another vehicle is more likely to occur as the distance to the other vehicle is shorter. Therefore, dazzling to the other vehicle can be effectively suppressed by inputting a signal indicating the other vehicle to the control unit CO in a case where the distance is equal to or less than the predetermined distance. In addition, when the distance to the other vehicle is larger than the predetermined distance, the light reduction region 210, 310 does not expand, so that it is possible to enhance the visibility of the host vehicle while suppressing dazzling of the other vehicle.

In the above example, the example in which the first region 211, 311 of the light reduction region 210, 310 expands to the side on which the other vehicle 80, 90 turn when the other vehicle 80, 90 issue the turn sign has been described. However, the entire light reduction region 210, 310 may expand to the side on which the other vehicle 80, 90 turn. In short, at least the first region may expand to the side on which the other vehicle 80, 90 turn.

In addition, it is not essential to form the second region 212, 312. However, as described above, by forming the second region 212, 312, forward visibility of the host vehicle can be improved.

Second Embodiment

Figure 14:
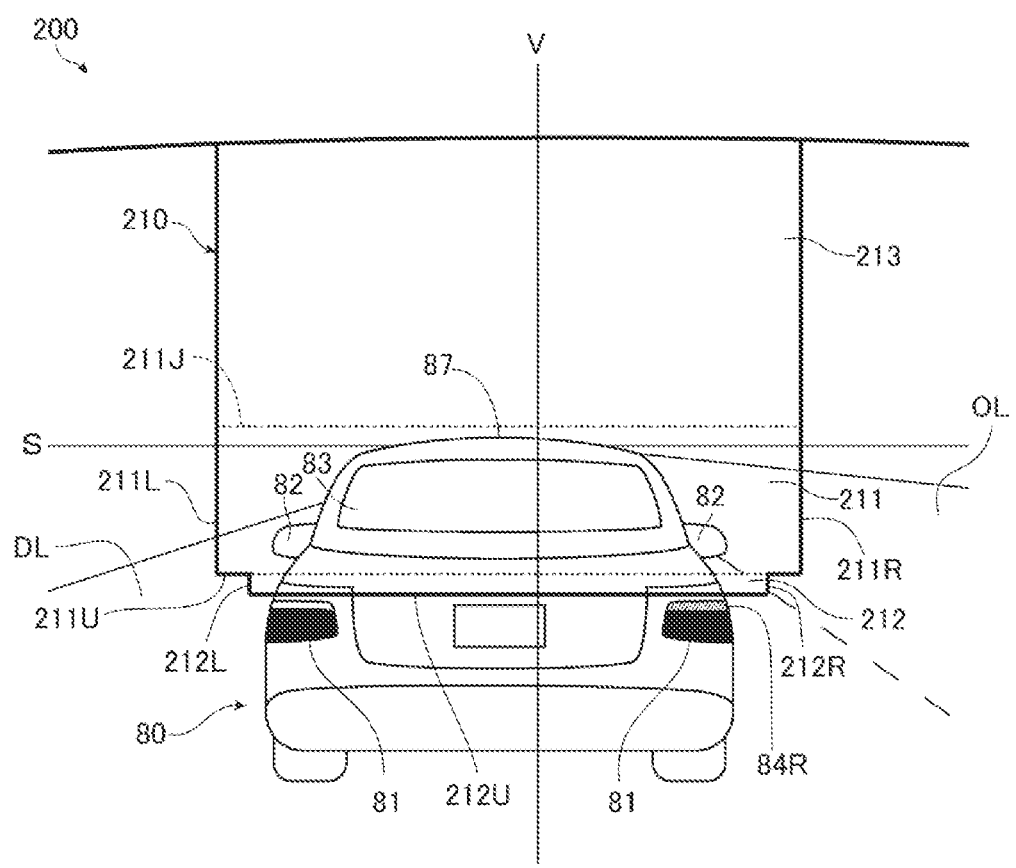
FIG. 14 is a view illustrating a light distribution pattern according to a second embodiment of the present invention from the same viewpoint as FIG. 10.
Figure 15:
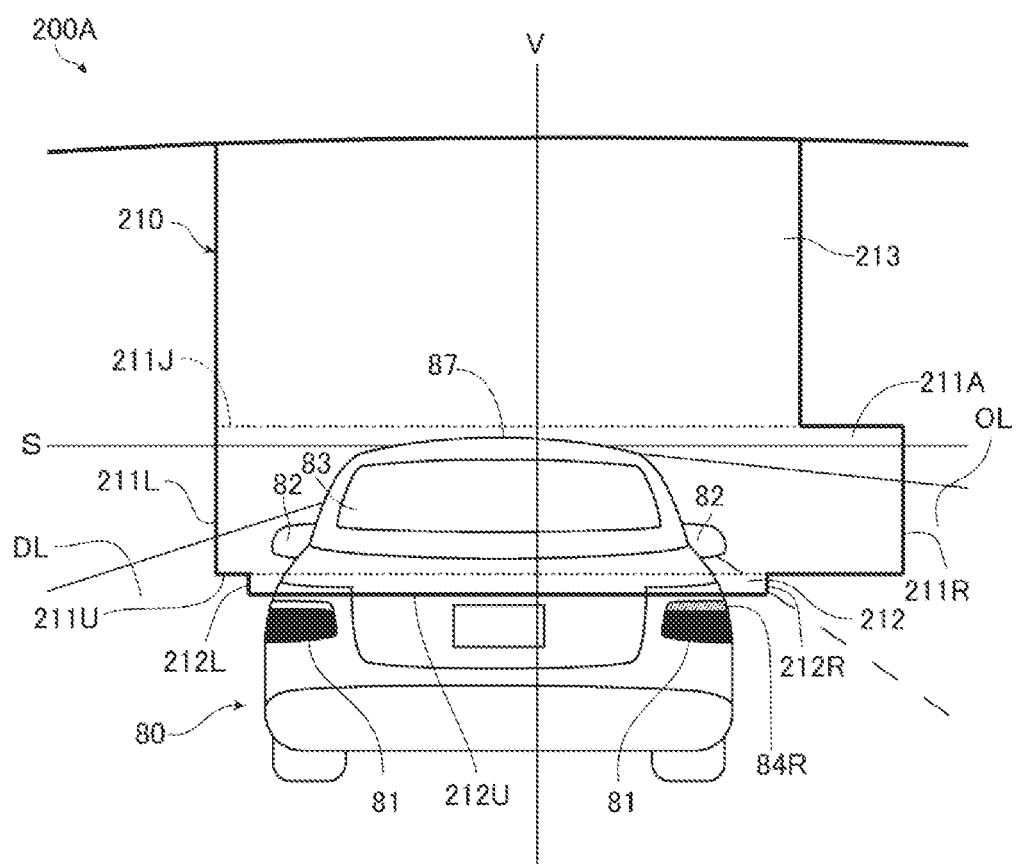
FIG. 15 is a view illustrating a state in which the light distribution pattern illustrated in FIG. 14 is changed.

Next, a case where another vehicle is the preceding vehicle 80 will be described as an example of the second embodiment. Note that the present embodiment can also be applied to a case where the other vehicle is the oncoming vehicle 90. FIG. 14 is a view illustrating the light distribution pattern in the second embodiment from the same viewpoint as FIG. 10. FIG. 15 is a diagram illustrating a state in which the light distribution pattern illustrated in FIG. 14 is changed. Note that the same or equivalent components as those of the first embodiment are denoted by the same reference numerals and redundant description is omitted unless otherwise specified.

The shape of the light distribution pattern 200 and the light intensity distribution in the present embodiment, and the shape of the light reduction region 210 and the light intensity distribution in the present embodiment are similar to those of the light distribution pattern 200 and the light reduction region 210 in the first embodiment. However, as illustrated in FIG. 14, a region other than the second region 212 in the light distribution pattern 200 of the present embodiment is divided into a first region 211 and a third region 213. In this respect, the light distribution pattern 200 of the present embodiment is different from the light distribution pattern 200 of the first embodiment.

The first region 211 and the third region 213 of the present embodiment are partitioned with reference to a line extending in the horizontal direction slightly above the roof panel 87 of the preceding vehicle 80. The line is indicated by a broken line in FIG. 14, and the broken line corresponds to the upper edge 211J of the first region 211. Similarly to the first region 211 of the first embodiment, the first region 211 is a region overlapping with the entire side mirror 82 and the entire rear-view mirror 83 which are visual recognition portions of the preceding vehicle 80. The third region 213 is connected to the upper edge 211J of the first region 211, and is located at the top of the light reduction region 210.

As illustrated in FIG. 15, for example, when it is determined that the preceding vehicle 80 issues a turn sign to the right, the control unit CO of the present embodiment controls the light emitting unit 10 so that the first region 211 expands to the right side, which is the turning direction side of the preceding vehicle 80, as compared with after the signal indicating the other vehicle is input and before the signal indicating the turn sign of the other vehicle is input, and the right edge, which is the turning direction side of the third region 213, does not move from the position before the second determination is made. By such control, the changed light distribution pattern 200A of the present embodiment becomes a light distribution pattern having the first region 211A in which the first region 211 expands to the right side.

As described above, in the present embodiment, when the other vehicle issues the turn sign, since the third region located on the upper side of the first region does not expand toward the turning direction side, the proportion of the bright region in the light distribution pattern becomes larger than that in the case where the third region expands together with the first region. Therefore, it is possible to suppress a decrease in forward visibility of the host vehicle. In addition, since the first region expands to the side where the other vehicle issues the turn sign as described above, it is possible to prevent the driver of the other vehicle from being dazzled.

When a signal indicating a turn sign of another vehicle is further input in addition to a signal indicating another vehicle, the control unit CO may control the light emitting unit 10 so that the edge of the third region 213 on the turning direction side is located closer to the other vehicle than the edge of the first region on the turning direction side. Even in this case, the expansion of the third region 213 toward the turning direction side is suppressed. As a result, the proportion of the bright region in the light distribution pattern increases as compared with the case where the expand of the third region 213 toward the turning direction side is equal to the expand of the first region 211 toward the turning direction side. Therefore, it is possible to suppress a decrease in forward visibility of the host vehicle.

In addition, the position in the vertical direction of the upper edge of the first region is not particularly limited as long as it does not prevent the first region from overlapping with the entire visual recognition portion of another vehicle. However, it is preferable that the light distribution pattern is located above the roof panel of another vehicle and below substantially the center between the upper edge of the light distribution pattern and the roof panel. The visual recognition portion of the other vehicle exists substantially below the roof panel of the other vehicle. Therefore, if the upper edge of the first region is located above the roof panel, the entire visual recognition portion can more reliably overlap with the first region. In addition, if the upper edge of the first region is at a position lower than the center between the upper edge of the light distribution pattern and the roof panel, the area of the third region can be suppressed from becoming too small. For this reason, when another vehicle issues a turn sign, unnecessary expansion of the light reduction region is further suppressed, and deterioration in forward visibility of the host vehicle can be further suppressed.

Third Embodiment

Figure 16:
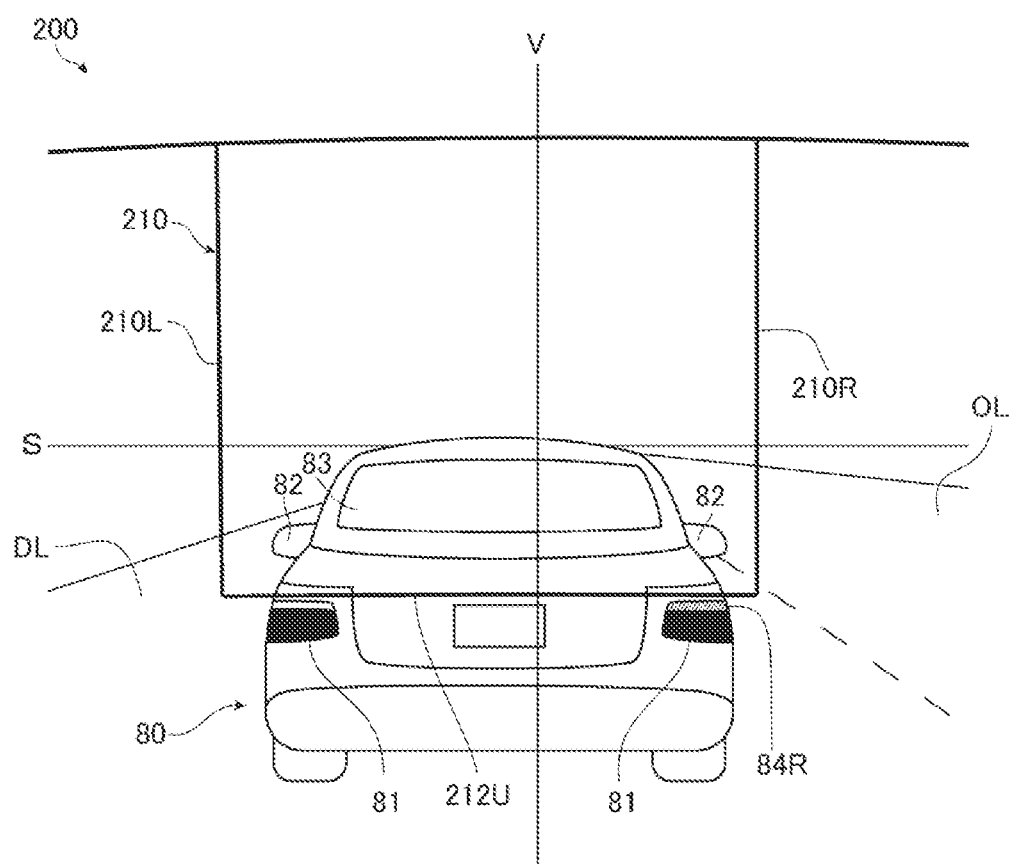
FIG. 16 is a view illustrating a light distribution pattern according to a third embodiment of the present invention from the same viewpoint as FIG. 10.
Figure 17:
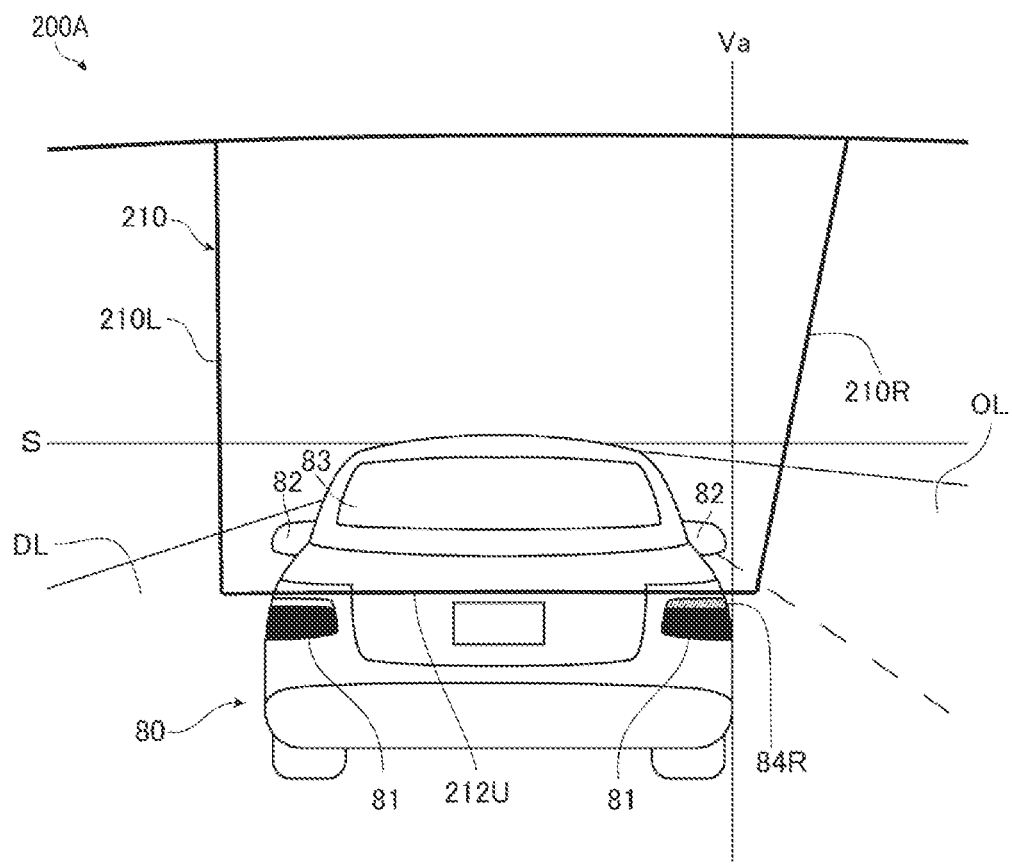
FIG. 17 is a view illustrating a state in which the light distribution pattern illustrated in FIG. 16 is changed.

Next, a third embodiment will be described with an example in which the other vehicle is a preceding vehicle 80. Note that the present embodiment can also be applied to a case where the other vehicle is the oncoming vehicle 90. FIG. 16 is a view illustrating the light distribution pattern in the third embodiment from the same viewpoint as FIG. 10. FIG. 17 is a diagram illustrating a state in which the light distribution pattern illustrated in FIG. 16 is changed. Note that the same or equivalent components as those of the first embodiment are denoted by the same reference numerals and redundant description is omitted unless otherwise specified.

As illustrated in FIG. 16, the left edge 210L and the right edge 210R of the light distribution pattern 200 of the present embodiment extend substantially vertically. In this respect, the light distribution pattern 200 of the present embodiment is similar to the light distribution patterns 200 of the first embodiment and the second embodiment in which both edges in the horizontal direction of the light distribution pattern 200 extend vertically. However, the light distribution pattern 200 of the present embodiment is mainly different from the light distribution patterns 200 of the first embodiment and the second embodiment in that the first region and the second region are formed as a single region without distinction. Therefore, it can be interpreted that the light distribution pattern 200 of the present embodiment is formed only of the first region.

Here, for example, a case where the preceding vehicle 80 issues a turn sign to the right and a signal indicating the turn sign of the preceding vehicle 80 is input to the control unit CO will be considered. In this case, as illustrated in FIG. 17, the turning direction side indicated by the turn sign of the preceding vehicle 80 is the right side as viewed from the host vehicle, and the control unit CO controls the light emitting unit 10 so that the right edge 210R of the light reduction region 210 is separated from the vertical line Va passing through the right end portion of the preceding vehicle 80 as going upward. As a result, a region overlapping with the visual recognition portion in the light reduction region 210 expands to the side on which the preceding vehicle 80 turns. Therefore, it is possible to suppress dazzling of the driver of the preceding vehicle 80 when the preceding vehicle 80 turns. In addition, in this case, since the first region, the second region, and the third region can be controlled without distinction, the control load of the control unit CO can be reduced.

As described above, in the present embodiment, when the signal indicating the turn sign of the other vehicle 80, 90 is input, the control unit CO controls the light emitting unit 10 so that the edge on the turning direction side of the light reduction region 210, 310 is separated from the vertical line passing through the end on the turning direction side of the other vehicle 80, 90 as going upward.

Note that FIG. 17 illustrates an example in which the right edge 210R of the light reduction region 210 is inclined so as to be separated from the vertical line Va as going upward. However, as long as the edge on the turning direction side of the light reduction region 210, 310 is separated from the vertical line passing through the end portion on the turning direction side of the other vehicle 80, 90 as going upward, the edge does not necessarily need to be inclined, and may have a staircase shape, for example.

Although the present invention has been described by taking the above-described embodiment as an example, the present invention is not limited thereto.

For example, in the above embodiment, the vehicle headlight that changes the light distribution pattern of the high beam according to another vehicle detected by the detection device 20 has been described as an example. However, the vehicle headlight may change a light distribution pattern of light emitted according to another vehicle detected by the detection device 20. For example, the vehicle headlight may change a light distribution pattern of a low beam according to another vehicle detected by the detection device 20.

In the above embodiment, the light emitting unit 10 having the light distribution pattern forming unit 12 which is a so-called LED array has been described as an example. However, the light emitting unit 10 is not particularly limited as long as the light distribution pattern of the emitted light can be changed. For example, the light emitting unit 10 may be configured to form a predetermined light distribution pattern by scanning light emitted from a light source using a reflector such as a rotating reflector, a micro electro mechanical system (MEMS), or a galvanometer mirror. In this case, the light distribution pattern of the emitted light can be changed by adjusting the inclination of the reflector or adjusting the light emitted from the light source. In addition, the configuration of the light emitting unit 10 may be a configuration in which light emitted from a light source is diffracted using liquid crystal on silicon (LCOS) to form a predetermined light distribution pattern. In this case, the light distribution pattern of the emitted light can be changed by adjusting the alignment of the liquid crystal in the LCOS.

In the above embodiment, the example in which the light intensity distribution in the region other than the light reduction region 210, 310 in the light distribution pattern 200, 300 is substantially the same as the light intensity distribution in the region other than the region corresponding to the light reduction region 210, 310 in the light distribution pattern PH has been described, but the present invention is not limited thereto. However, from the viewpoint of suppressing the driver of the vehicle 100 from feeling uncomfortable, it is preferable that the light intensity distribution in the other region other than the light reduction region 210, 310 does not change.

Furthermore, the intensity of light in the light reduction region 210, 310 may change according to, for example, a distance from the vehicle 100 to another vehicle.

In addition, the shape of the light distribution pattern described in the above embodiment is exemplary and can be appropriately changed. For example, the widths of the first region, the second region, and the third region in the horizontal direction may not be constant along the vertical direction.

Furthermore, in the above-described embodiment, an example has been described in which the detection device 20 detects the preceding vehicle 80 on the basis of the light from the tail light 81 of the preceding vehicle 80, and detects the oncoming vehicle 90 on the basis of the light from the headlight 91 of the oncoming vehicle 90, but the configuration of the detection device 20 is not limited thereto. For example, the detection device 20 may detect the side mirror 82, the rear-view mirror 83, and the like which are visual recognition portions of the preceding vehicle 80, or may detect the front window 93 and the like which are visual recognition portions of the oncoming vehicle 90. In this case, the control unit CO may control the pair of light emitting units 10 based on the information of the visual recognition portion detected by the detection device 20.

In the above embodiment, the example in which the turn sign is issued by the turn lamp has been described, but the turn sign is not limited thereto. Examples of the other turn sign include communication information between vehicles in the automatic driving mode, road information obtained from navigation, road surface drawing drawn by another vehicle, and the like.

In the above embodiment, an example has been described in which a signal indicating another vehicle is input from the determination unit 25 to the control unit CO. However, a signal indicating another vehicle may be input from the detection device 20 to the control unit CO. In this case, since the signal indicating the other vehicle is input to the control unit CO without the determination by the determination unit 25, the signal indicating the turn sign of the other vehicle is input to the control unit CO, so that the first region can be expanded to the turning direction side indicated by the turn sign without depending on the distance to the other vehicle.

According to the present invention, a vehicle headlight capable of suppressing dazzling of a driver of another vehicle when the other vehicle turns, and a vehicle headlight system including the vehicle headlight are provided, and can be used in the field of vehicle headlights such as automobiles.

The invention claimed is:

1. A vehicle headlight mounted on a host vehicle, comprising:
   a light emitting unit that emits light of a changeable light distribution pattern toward another vehicle located in front of the host vehicle;
   a determination unit that determines information from a detection device that detects the other vehicle and generates a signal indicating a turn sign of the other vehicle; and
   a control unit that receives a signal indicating the other vehicle detected by the detection device and a signal indicating a turn sign of the other vehicle,
   wherein
   the control unit controls the light emitting unit such that, when the signal indicating the other vehicle is input, a region including at least a first region overlapping with an entire visual recognition portion for allowing a driver of the other vehicle to visually recognize the outside of the host vehicle in the light distribution pattern becomes a light reduction region in which a total light flux amount of light from the light emitting unit decreases as compared with that before the signal indicating the other vehicle is input, and controls the light emitting unit such that, when the signal indicating a turn sign of the other vehicle is further input in addition to the signal indicating the other vehicle, at least the first region in the light reduction region expands to a turning direction side indicated by the turn sign as compared with that after the signal indicating the other vehicle is input and before the signal indicating the turn sign of the other vehicle is input;
   the light reduction region includes a second region connected to a lower edge of the first region;
   a left edge of the second region is located on a right side of a left edge of the first region, and a right edge of the second region is located on a left side of a right edge of the first region; and
   a lower edge of the second region overlaps the other vehicle.

2. The vehicle headlight according to claim 1, wherein the light reduction region includes a third region connected to an upper edge of the first region, and
   the control unit controls the light emitting unit such that an edge of the third region on the turning direction side is located closer to the other vehicle than an edge of the first region on the turning direction side when the signal indicating the turn sign of the other vehicle is further input in addition to the signal indicating the other vehicle.

3. The vehicle headlight according to claim 2, wherein the control unit controls the light emitting unit so that an edge of the third region on the turning direction side does not move from a position before the signal indicating the turn sign of the other vehicle is input when the signal indicating the turn sign of the other vehicle is further input in addition to the signal indicating the other vehicle.

4. The vehicle headlight according to claim 2, wherein a position in a vertical direction of an upper edge of the first region is a position above a roof panel of the other vehicle and below a center between the upper edge of the light distribution pattern and the roof panel.

5. The vehicle headlight according to claim 1, wherein the control unit controls the light emitting unit such that an edge of the light reduction region on the turning direction side is separated from a vertical line passing through an end portion of the other vehicle on the turning direction side as going upward when the signal indicating the turn sign of the other vehicle is further input in addition to the signal indicating the other vehicle.

6. The vehicle headlight according to claim 1, wherein the determination unit determines a distance to the other vehicle based on information from the detection device, and outputs a signal indicating the other vehicle to the control unit when the distance is equal to or less than a predetermined distance.

7. A vehicle headlight system comprising:
   the vehicle headlight according to claim 1; and
   a detection device that detects the other vehicle.

* * * * *